US012803360B2

(12) United States Patent
Iwasaki et al.

(10) Patent No.: US 12,803,360 B2
(45) Date of Patent: Nov. 17, 2026

(54) STATOR AND MOTOR

(71) Applicant: Murata Manufacturing Co., Ltd., Nagaokakyo (JP)

(72) Inventors: Kazuki Iwasaki, Nagaokakyo (JP); Takashi Mochida, Nagaokakyo (JP); Mitsutoshi Natsumeda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 190 days.

(21) Appl. No.: 18/976,508

(22) Filed: Dec. 11, 2024

(65) Prior Publication Data

US 2025/0105695 A1 Mar. 27, 2025

Related U.S. Application Data

(63) Continuation of application No. PCT/JP2023/022252, filed on Jun. 15, 2023.

(30) Foreign Application Priority Data

Jun. 17, 2022 (JP) ................................ 2022-098186

(51) Int. Cl.
*H02K 3/52* (2006.01)

(52) U.S. Cl.
CPC ......... *H02K 3/522* (2013.01); *H02K 2203/06* (2013.01)

(58) Field of Classification Search
CPC .......................... H02K 3/522; H02K 2203/06
See application file for complete search history.

(56) References Cited

U.S. PATENT DOCUMENTS

2020/0119600 A1 4/2020 Inuzuka

FOREIGN PATENT DOCUMENTS

| | | | | |
|---|---|---|---|---|
| JP | 2007-295637 A | | 11/2007 | |
| JP | 2008-061408 A | | 3/2008 | |
| JP | 2008-278693 A | | 11/2008 | |
| JP | 2019-004601 A | | 1/2019 | |
| WO | WO-2023243685 A1 | * | 12/2023 | ............ H02K 3/522 |

OTHER PUBLICATIONS

International Search Report received for PCT Patent Application No. PCT/JP2023/022252, mailed on Jul. 11, 2023, 2 pages (English translation only).

* cited by examiner

*Primary Examiner* — Terrance L Kenerly
(74) *Attorney, Agent, or Firm* — ArentFox Schiff LLP

(57) ABSTRACT

A device is provided that includes a stator core having a molded body of magnetic powder that includes an annular yoke extending circumferentially and a tooth protruding radially from the yoke's inner surface. The device further includes a coil that includes a winding wire wound around the tooth. A terminal plate is fixed to the axial end surface of the yoke and includes a plate portion and a terminal portion. The plate portion features a first main surface on the side of the yoke's end surface and a second main surface on the opposite side. The terminal portion extends axially from the second main surface. One end of the winding wire is fixed to the terminal portion by being bound around it. This configuration facilitates electrical connection and structural integration within the stator core.

20 Claims, 15 Drawing Sheets

STATOR AND MOTOR

CROSS REFERENCE TO RELATED APPLICATIONS

This application is a continuation of International Application No. PCT/JP2023/022252, filed Jun. 15, 2023, which claims priority to Japanese Patent Application No. 2022-098186, filed Jun. 17, 2022, the contents of each of which are hereby incorporated by reference in their entirety.

TECHNICAL FIELD

The present disclosure relates to a stator and a motor.

BACKGROUND

For example, Japanese Unexamined Patent Application Publication No. 2008-61408 (hereinafter the "'408 Application") discloses an electric motor including a rotor having a plurality of magnetic poles separated from each other in a circumferential direction and a stator surrounding the rotor. The stator includes an annular stator core formed by molding magnetic powder, and the stator core has an annular yoke and a plurality of teeth formed to protrude to an inner circumference of the yoke and separated from each other with a slot interposed therebetween in a circumferential direction of the yoke. The stator core is provided with a groove for winding a coil at each of both ends of the stator core in an axial direction corresponding to each of the teeth.

In the electric motor described in the '408 Application, a busbar is used to electrically extend a coil, and as illustrated in FIG. 4 and the like of the '408 Application, the busbar to which the coil is coupled is fixed to a stator core by screwing. However, when the busbar is fixed to the stator core by screwing, an additional processing of forming a screw hole in the stator core is required after the stator core is manufactured, and thus manufacturing efficiency lowers. Further, since the stator core is damaged when the screw hole is formed, strength of the stator core lowers. As described above, the electric motor described in the '408 Application has room for improvement in realizing the electrical extension of the coil while suppressing lowering in manufacturing efficiency and lowering in strength.

SUMMARY OF THE INVENTION

The exemplary aspects of the present disclosure have been made to solve the above problems. Thus, it is an object of the present disclosure to provide a stator configured to provide electrical extension of a coil while suppressing lowering in manufacturing efficiency and lowering in strength. Another object of the present disclosure provides a motor having the stator described above.

The stator according to the present disclosure includes a stator core including an annular yoke extending in a circumferential direction and a tooth protruding from an inner circumferential surface of the yoke in a radial direction of the yoke, and being formed of a molded body of magnetic powder; a coil formed of a winding wire wound around the tooth; and a terminal plate fixed to an end surface of the yoke in an axial direction of the stator core. The terminal plate includes a plate portion and a terminal portion fixed to the plate portion. The plate portion has, in the axial direction, a first main surface positioned on a side of the end surface of the yoke and a second main surface positioned on a side opposite to the end surface of the yoke. The terminal portion protrudes in the axial direction at least from the second main surface of the plate portion, and one end portion of the winding wire is fixed to the terminal portion in a state of being bound around the terminal portion.

The motor according to the present disclosure includes the stator according to the present disclosure and a rotor provided to face an inner circumferential surface of the stator.

According to the exemplary aspects of the present disclosure, a stator is provided that configures an electrical extension of a coil while suppressing lowering in manufacturing efficiency and lowering in strength. According to the present disclosure, a motor having the stator is also provided.

BRIEF DESCRIPTION OF DRAWINGS

In the descriptions that follow, like parts are marked throughout the specification and drawings with the same numerals, respectively. The drawings are not necessarily drawn to scale and certain drawings may be illustrated in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein.

DETAILED DESCRIPTION OF EMBODIMENTS

Figure 1:
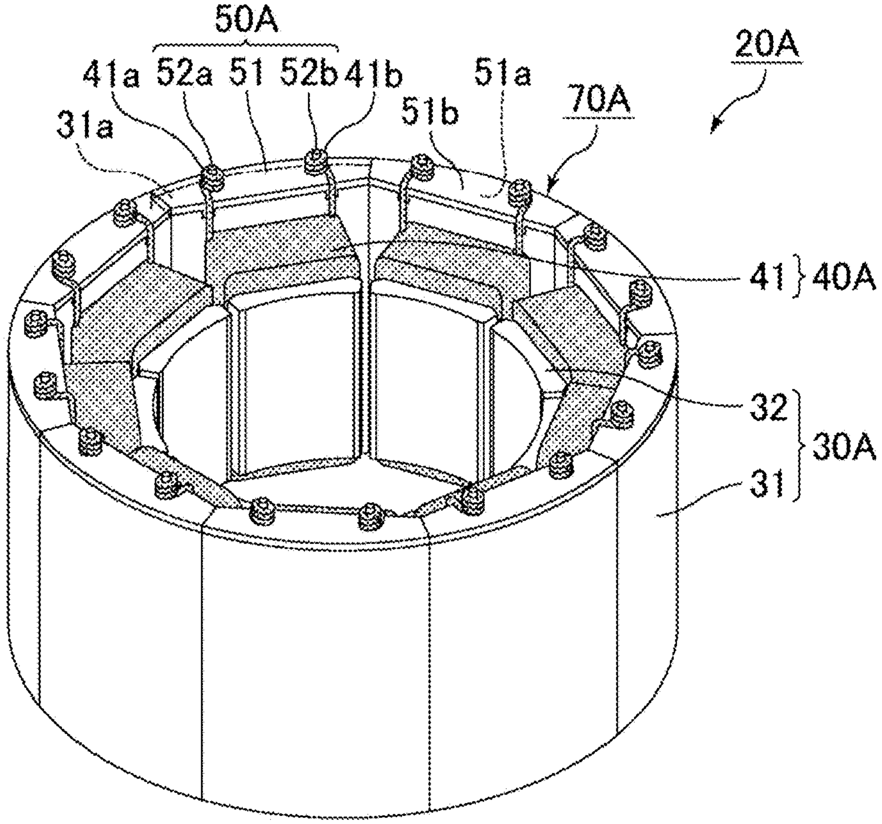
FIG. 1 is a schematic perspective view of an example of a stator in accordance with aspects of the present disclosure.

Hereinbelow, aspects of the present disclosure will be described. In a following description of the drawings, the same or similar components will be represented with use of the same or similar reference characters. The drawings are exemplary, sizes or shapes of portions are schematic, and technical scope of the present disclosure should not be understood with limitation to the aspects.

Further, the stator of the present disclosure and the motor of the present disclosure will be described. The present disclosure is not limited to the following configurations, and may be appropriately modified without departing from the scope of the present disclosure. Further, a combination of a plurality of individual preferred configurations described below is also included in the present disclosure.

Each of aspects described below is an example, and it is needless to say that partial replacement or combination of configurations described in different aspects is possible. In one aspect and subsequent aspects, a description of the same matters as those in one aspect will be omitted, and different points will mainly be described. In particular, the same operations and effects obtained by the same configurations will not be described in each aspect.

In the following description, when one aspect is not particularly distinguished from the other, it is simply referred as "stator of the present disclosure" and "motor of the present disclosure".

The drawings described below are schematic ones, and dimensions, scales of aspect ratios, and the like may be different from those of an actual product.

The stator according to the present disclosure includes a stator core including an annular yoke extending in a circumferential direction and a tooth protruding from an inner circumferential surface of the yoke in a radial direction of the yoke, and being formed of a molded body of magnetic powder; a coil formed of a winding wire wound around the tooth; and a terminal plate fixed to an end surface of the yoke in an axial direction of the stator core. The terminal plate includes a plate portion and a terminal portion fixed to the plate portion. The plate portion has, in the axial direction, a first main surface positioned on a side of the end surface of the yoke and a second main surface positioned on a side opposite to the end surface of the yoke. The terminal portion protrudes in the axial direction at least from the second main surface of the plate portion, and one end portion of the winding wire is fixed to the terminal portion in a state of being bound around the terminal portion.

An example of a stator of the present disclosure will be described as follows.

FIG. 1 is a schematic perspective view of an example of the stator according to an aspect of the present disclosure.

A stator 20A in FIG. 1 includes a stator core 30A, a plurality of coils 40A, and a plurality of terminal plates 50A.

The stator core 30A includes a yoke (also referred to as core back) 31 and a plurality of teeth 32.

In the present description, a direction in which an axis of the stator core extends is defined as an axial direction. A direction extending along an outer circumferential surface of the yoke when viewed in the axial direction is defined as a circumferential direction. Further, a direction orthogonal to the axial direction and in which the outer circumferential surface and an inner circumferential surface of the yoke face each other is defined as a radial direction.

The yoke 31 has an annular shape extending along the circumferential direction.

The plurality of teeth 32 each independently protrude from an inner circumferential surface of the yoke 31 in the radial direction of the yoke 31 to be separated from each other in the circumferential direction. As described above, the plurality of teeth 32 each are integrated with the yoke 31.

The stator core 30A is formed of a molded body of magnetic powder. Namely, the yoke 31 and the teeth 32 of the stator core 30A are integrally formed of a molded body of magnetic powder.

In the stator of the present disclosure, the stator core is formed, for example, of a powder magnetic core.

In the stator 20A, the stator core 30A formed, for example, of a powder magnetic core. Namely, the yoke 31 and the teeth 32 of the stator core 30A are integrally formed of a powder magnetic core, for example.

The stator core 30A is not necessarily a powder magnetic core, and may be formed of a molded body of a composite material containing magnetic powder and a resin.

The plurality of coils 40A each are constituted of a winding wire 41 wound around the tooth 32. The plurality of coils 40A each are independently provided to the tooth 32 to be separated from each other in the circumferential direction.

The plurality of coils 40A each are insulated from the tooth 32 with an insulation member which will be described below interposed therebetween, for example.

For example, in a case of three phases, the plurality of coils 40A include a coil formed of a U-phase winding wire, a coil formed of a V-phase winding wire, and a coil formed of a W-phase winding wire. As described above, the U-phase winding wire, the V-phase winding wire, and the W-phase winding wire are coupled in a star coupling or a delta coupling.

The winding wire 41 may be a polyurethane copper wire (UEW) or the like, for example.

The plurality of terminal plates 50A each are fixed to an end surface 31*a* of the yoke 31 in the axial direction of the stator core 30A.

The terminal plate 50A includes a plate portion 51, a terminal portion 52*a*, and a terminal portion 52*b*.

The plate portion 51, in the axial direction, has a first main surface 51*a* positioned on a side of the end surface 31*a* of the yoke 31 and a second main surface 51*b* positioned on a side opposite to the end surface 31*a* of the yoke 31.

The plate portion 51 is made of an insulation material, for example.

Examples of the insulation material forming the plate portion 51 include a resin such as polyphenylene sulfide (PPS).

The terminal portions 52*a* and 52*b* each are fixed to the plate portion 51.

The terminal portions 52*a* and 52*b* each protrude in the axial direction at least from the second main surface 51*b* of the plate portion 51.

The terminal portions 52*a* and 52*b* are separated from each other in the circumferential direction.

In the stator of the present disclosure, the terminal portion is made, for example, of a conductive material.

In the stator 20A, the terminal portions 52*a* and 52*b* each are made, for example, of a conductive material. As described above, one end portion 41*a* of the winding wire 41 and a terminal of a wiring substrate, as described below, may easily be coupled to each other via the terminal portion 52*a*. Further, the other end portion 41*b* of the winding wire 41 and a terminal of a wiring substrate, as described below, may easily be coupled to each other via the terminal portion 52*b*.

Examples of the conductive material forming the terminal portions 52*a* and 52*b* include a metal such as phosphor bronze.

The terminal portions 52*a* and 52*b* may be made of an insulation material. As described above, since it is not necessary to consider insulation between the terminal portion 52*a* and the stator core 30A and further the insulation between the terminal portion 52*b* and the stator core 30A, the terminal portions 52*a* and 52*b* may easily be fixed to the plate portion 51. Further, by integrally molding the terminal portions 52*a* and 52*b* with the plate portion 51, the terminal plate 50A may easily be manufactured.

Examples of the insulation material forming the terminal portions 52*a* and 52*b* include a resin such as polyphenylene sulfide.

The materials of the terminal portions 52*a* and 52*b* are the same, for example, but may be different from each other.

Examples of three-dimensional shapes of the terminal portions 52*a* and 52*b* include a cylindrical shape and a prismatic shape.

The three-dimensional shapes of the terminal portions 52*a* and 52*b* are the same, for example, but may be different from each other.

As described above, the terminal plate 50A is fixed to the end surface 31*a* of the yoke 31. Namely, the terminal plate 50A is fixed to the end surface 31*a* of the yoke 31 on a side of the first main surface 51*a* of the plate portion 51.

The terminal plate 50A is fixed to the end surface 31*a* of the yoke 31, for example, with an insulation member (not illustrated) interposed therebetween. Namely, an insulation member is interposed, for example, between the end surface 31*a* of the yoke 31 and the first main surface 51*a* of the plate portion 51. As described above, insulation between the yoke 31 and the terminal plate 50A, particularly, insulation between the yoke 31 and the terminal portion 52*a* and insulation between the yoke 31 and the terminal portion 52*b* are ensured.

The insulation member may be an insulation film that covers at least one of the end surface 31*a* of the yoke 31 and the first main surface 51*a* of the plate portion 51. As described above, the end surface 31*a* of the yoke 31 may be covered with an insulation film, the first main surface 51*a* of the plate portion 51 may be covered with an insulation film, or both the end surface 31*a* of the yoke 31 and the first main surface 51*a* of the plate portion 51 may be covered with an insulation film.

When the end surface 31*a* of the yoke 31 is covered with an insulation film, an entire surface of the stator core 30A is covered with the insulation film, for example. When the end surface 31*a* of the yoke 31 is covered with an insulation film, the entire surface of the stator core 30A is not necessarily covered.

When the first main surface 51*a* of the plate portion 51 is covered with an insulation film, an entire surface of the plate portion 51 is covered with the insulation film, for example. When the first main surface 51*a* of the plate portion 51 is covered with an insulation film, the entire surface of the plate portion 51 is not necessarily covered.

Methods of covering a target surface such as the end surface 31*a* of the yoke 31 and the first main surface 51*a* of the plate portion 51 with an insulation film include a method of applying an insulation material to the target surface by a coating method such as electrodeposition coating.

The insulation member may be an insulation sheet preformed from an insulation material. In the case above, the insulation sheet is disposed at least between the end surface 31*a* of the yoke 31 and the first main surface 51*a* of the plate portion 51.

When the plate portion 51 is made of an insulation material as described above, the first main surface 51*a* of the plate portion 51 is not necessarily covered with an insulation film. However, for example, when the terminal portions 52*a* and 52*b* are exposed from the first main surface 51*a* of the plate portion 51, as described below, exposed portions of the terminal portions 52*a* and 52*b* exposed from the first main surface 51*a* of the plate portion 51 are covered with an insulation film, for example.

The one end portion 41*a* of the winding wire 41 is fixed to the terminal portion 52*a* in a state of being bound around the terminal portion 52*a*. Thus, the one end portion 41*a* of the winding wire 41 is extended to the terminal plate 50A.

The one end portion 41*a* of the winding wire 41 may be bound around the terminal portion 52*a*, and then fixed to the terminal portion 52*a* by solder bonding or the like. Alternatively, the one end portion 41*a* of the winding wire 41 may be bound around the terminal portion 52*a*, and then fixed to the terminal portion 52*a* and a terminal of a wiring substrate, as described below, by solder bonding or the like.

The other end portion 41*b* of the winding wire 41 is fixed, for example, to the terminal portion 52*b* in a state of being bound around the terminal portion 52*b*. As described above, the other end portion 41*b* of the winding wire 41 is extended to the terminal plate 50A.

The other end portion 41*b* of the winding wire 41 may be bound around the terminal portion 52*b*, and then fixed to the terminal portion 52*b* by solder bonding or the like. Alternatively, the other end portion 41*b* of the winding wire 41 may be bound around the terminal portion 52*b*, and then fixed to the terminal portion 52*b* and a terminal of a wiring substrate, as described below, by solder bonding or the like.

The stator 20A may include at least one coil 40A in which the one end portion 41*a* of the winding wire 41 is fixed to the terminal portion 52*a* in a state of being bound around the terminal portion 52*a*, for example, for all the coils 40A, the one end portion 41*a* of the winding wire 41 is fixed to the terminal portion 52*a* in a state of being bound around the terminal portion 52*a*.

In the stator 20A, as illustrated in FIG. 1, all the coils 40A, the one end portion 41*a* of the winding wire 41 is fixed to the terminal portion 52*a* in a state of being bound around the terminal portion 52*a*, and the other end portion 41*b* of the winding wire 41 is fixed to the terminal portion 52*b* in a state of being bound around the terminal portion 52*b*, for example.

In the stator 20A, as long as at least one coil 40A is present in which the one end portion 41*a* of the winding wire 41 is fixed to the terminal portion 52*a* in a state of being bound around the terminal portion 52*a*, there may be a coil 40A in which the one end portion 41*a* of the winding wire 41 is fixed to the terminal portion 52*a* in a state of being bound around the terminal portion 52*a* and the other end portion 41*b* of the winding wire 41 is not fixed to the terminal portion 52*b* in a state of being bound around the terminal portion 52*b*, and there may be a coil 40A in which neither of the end portions of the winding wire 41 is fixed to the terminal portion in a state of being bound around the terminal portion.

As described above, in the stator 20A, by using the terminal plate 50A fixed to the end surface 31*a* of the yoke 31, electrical extension of the coil 40A, for example, electrical extension of the coil 40A to electrically couple to a wiring substrate, as described below, is realized.

When the stator 20A is manufactured, as described below, it is not necessary to perform additional processing on the molded stator core 30A in order to fix the terminal plate 50A to the end surface 31*a* of the yoke 31. This suppresses lowering in the manufacturing efficiency of the stator 20A.

When the stator 20A is manufactured, as described below, it is not necessary to perform additional processing on the molded stator core 30A in order to fix the terminal plate 50A to the end surface 31*a* of the yoke 31. This avoids damage to the stator core 30A when the stator 20A is manufactured, and as a result, lowering in the strength of the stator 20A (more specifically, stator core 30A) is suppressed.

Consequently, with the use of the stator 20A, it is possible to realize the electrical extension of the coil 40A while suppressing lowering in manufacturing efficiency and lowering in strength.

Further, in the stator 20A, since the terminal plate 50A is fixed to the end surface 31*a* of the yoke 31, presence of the terminal plate 50A does not lower the space factor of the coil 40A (winding wire 41). This ensures the power density of the motor in which the stator 20A is incorporated.

Hereinafter, a stator configured of a plurality of coil units annularly arranged in a circumferential direction will be described as an example of the stator of the present disclosure, and a fixing aspect of the terminal plate and the end surface of the yoke in each coil unit will be described.

The stator of the present disclosure may be configured such that a plurality of coil units are annularly arranged in the circumferential direction, and the plurality of coil units may each independently include a divided core obtained by dividing the stator core in the circumferential direction, the coil, and the terminal plate.

The stator 20A in FIG. 1 is configured by annularly arranging a plurality of coil units 70A in the circumferential direction.

Figure 2:
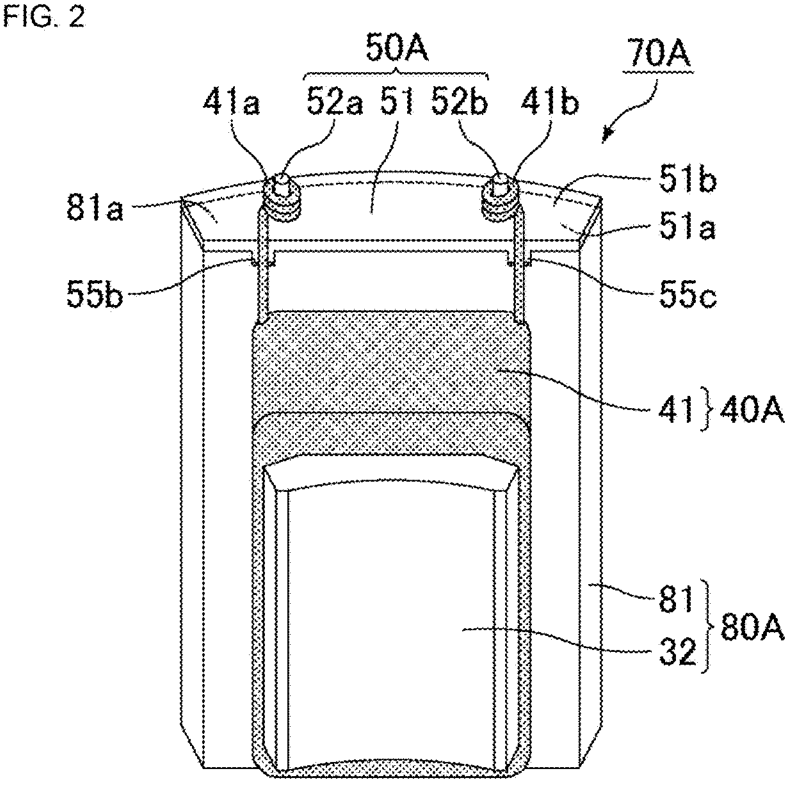
FIG. 2 is a schematic perspective view of a coil unit in FIG. 1.
Figure 3:
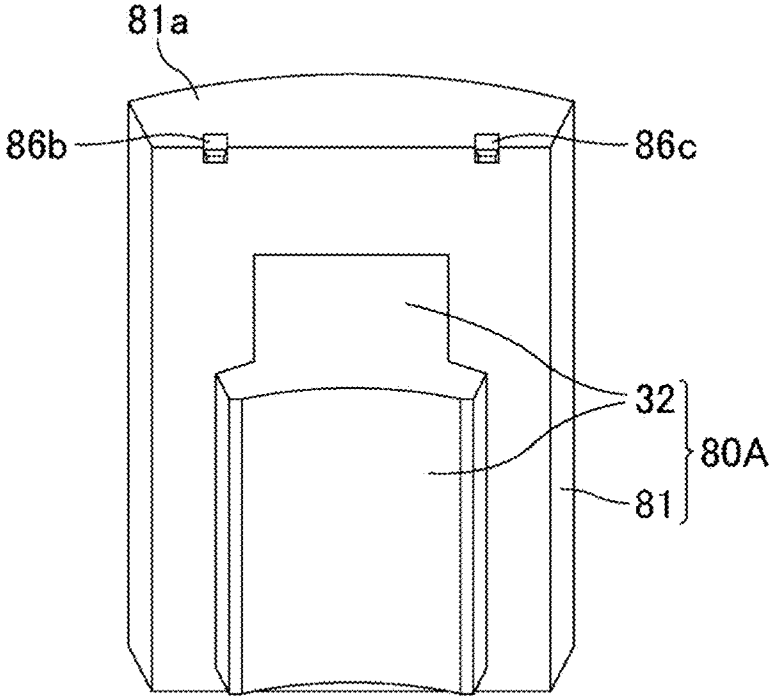
FIG. 3 is a schematic perspective view of a divided core in FIG. 2.
Figure 4:
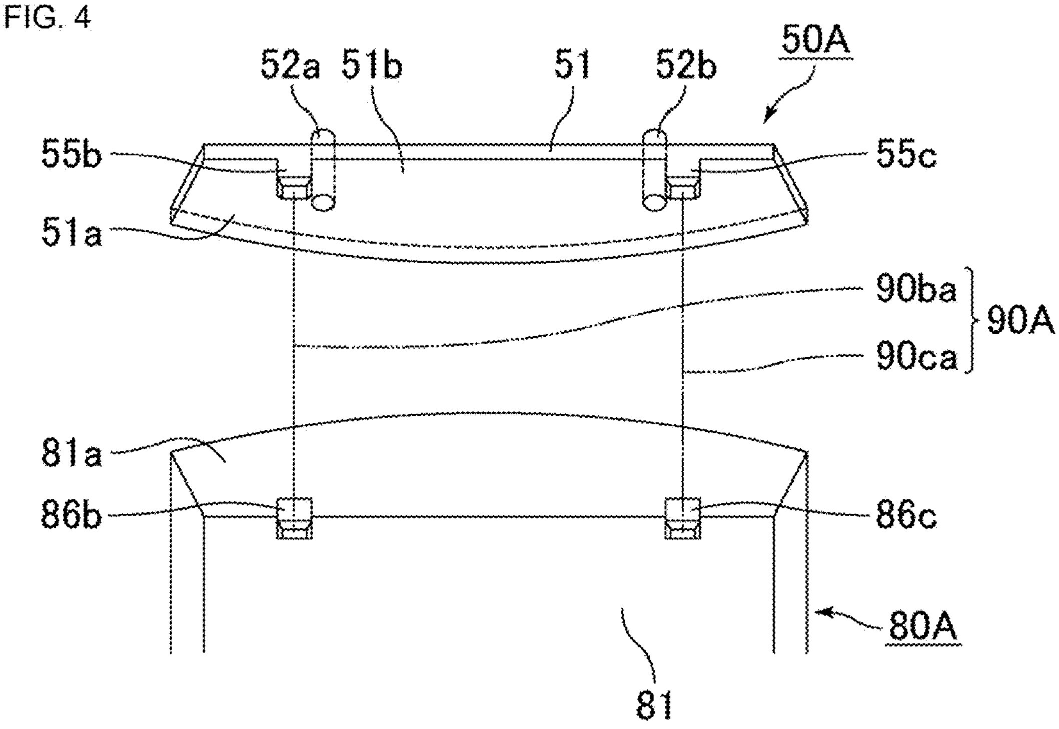
FIG. 4 is a schematic perspective view of an example of a state in which the divided core and a terminal plate in FIG. 2 are disassembled.

FIG. 2 is a schematic perspective view of a coil unit in FIG. 1. FIG. 3 is a schematic perspective view of a divided core in FIG. 2. FIG. 4 is a schematic perspective view of a state in which the divided core and a terminal plate in FIG. 2 are disassembled. In FIG. 4, the coil is not illustrated to facilitate understanding of a structure of the divided core and the terminal plate. For the same reason, the coil is not illustrated in the subsequent drawings illustrating the state in which the divided core and the terminal plate are disassembled.

The coil unit 70A in FIG. 2 includes a divided core 80A, the coil 40A, and the terminal plate 50A.

The divided core 80A is obtained by dividing the stator core 30A in the circumferential direction. Specifically, the stator core 30A is configured by annularly arranging the plurality of divided cores 80A in the circumferential direction.

The divided core 80A includes a divided yoke 81 and the tooth 32.

The divided yoke 81 is obtained by dividing the yoke 31 in the circumferential direction.

The tooth 32 protrudes from an inner circumferential surface of the divided yoke 81 in the radial direction. As described above, the tooth 32 is integrated with the divided yoke 81.

The divided core 80A is formed of a molded body of magnetic powder. Namely, the divided yoke 81 and the tooth 32 of the divided core 80A are integrally formed of a molded body of magnetic powder.

When viewed in the axial direction, an outer circumference of the divided core 80A extending along the circumferential direction, namely, an outer circumference of the divided yoke 81 extending along the circumferential direction may have, for example, a curved shape, a straight shape, or a combination of a curved shape and a straight shape. An aspect in which the divided yokes 81, having the outer circumference with the shape described above when viewed in the axial direction, are arranged in the circumferential direction is included in an aspect in which the yoke 31 has an annular shape extending along the circumferential direction.

In the divided core 80A, the tooth 32 is narrower, for example, on a side of the divided yoke 81 than on a side opposite to the divided yoke 81 in at least one of the axial direction and the circumferential direction. In the example in FIG. 3, the tooth 32 is narrower in the circumferential direction on the side of the divided yoke 81 than on the side opposite to the divided yoke 81.

Namely, in the stator core 30A in which the plurality of divided cores 80A are annularly arranged in the circumferential direction, each of the teeth 32 is narrower, for example, on a side of the yoke 31 than on a side opposite to the yoke 31 in at least one of the axial direction and the circumferential direction.

When the tooth 32 is narrower on the side of yoke 31 (side of divided yoke 81) than on the side opposite to the yoke 31

(side opposite to divided yoke 81), the number of turns of the coil 40A may be increased by using the narrower portion as a winding axis of the coil 40A. As a result, in a motor in which the stator 20A is incorporated, magnetic flux passing through the coil 40A tends to increase, and thus, output torque of the motor tends to increase.

The coil 40A is provided to the tooth 32 of the divided core 80A.

The terminal plate 50A is fixed to an end surface 81*a* of the divided yoke 81 of the divided core 80A in the axial direction.

As illustrated in FIG. 4, the terminal portions 52*a* and 52*b* protrude from the second main surface 51*b* of the plate portion 51 in the axial direction.

The terminal portions 52*a* and 52*b* penetrate through the plate portion 51 in the axial direction and are exposed from the first main surface 51*a* of the plate portion 51.

Neither the terminal portion 52*a* nor the terminal portion 52*b* protrudes from the first main surface 51*a* of the plate portion 51 in the axial direction.

At least one of the terminal portions 52*a* and 52*b* may protrude from the first main surface 51*a* of the plate portion 51 in the axial direction.

In the stator of the present disclosure, the end surface of the yoke and the first main surface of the plate portion may be fitted to each other at a fitting portion. As described above, in the stator of the present disclosure, the fitting portion may be formed of a protrusion and a recess to be fitted. The protrusion protrudes from one of the end surface of the yoke and the first main surface of the plate portion in the axial direction. The recess is recessed from the other of the end surface of the yoke and the first main surface of the plate portion in the axial direction.

As illustrated in FIG. 3 and FIG. 4, the divided yoke 81 of the divided core 80A is provided with recesses 86*b* and 86*c* that are recessed from the end surface 81*a* in the axial direction.

The recesses 86*b* and 86*c* are provided to a peripheral edge of the end surface 81*a* of the divided yoke 81. More specifically, the recesses 86*b* and 86*c* are provided from the end surface 81*a* of the divided yoke 81 to the inner circumferential surface of the divided yoke 81 in the radial direction.

The recess 86*b* is separated from the recess 86*c* in the circumferential direction.

The three-dimensional shapes of the recesses 86*b* and 86*c* may be the same or may be different from each other.

As illustrated in FIG. 4, the plate portion 51 of the terminal plate 50A is provided with protrusions 55*b* and 55*c* that protrude from the first main surface 51*a* in the axial direction.

The protrusions 55*b* and 55*c* are provided to a peripheral edge of the first main surface 51*a* of the plate portion 51.

The protrusion 55*b* is separated from the protrusion 55*c* in the circumferential direction.

The three-dimensional shapes of the protrusions 55*b* and 55*c* may be the same or may be different from each other.

In the coil unit 70A, the end surface 81*a* of the divided yoke 81 and the first main surface 51*a* of the plate portion 51 are fitted to each other at a fitting portion 90A as illustrated in FIG. 4. The fitting portion 90A includes a fitting portion 90*ba* formed by fitting the recess 86*b* and the protrusion 55*b*, and a fitting portion 90*ca* formed by fitting the recess 86*c* and the protrusion 55*c*. For example, in the coil unit 70A, the recess 86*b* and the protrusion 55*b* are fitted to each other, and the recess 86*c* and the protrusion 55*c* are fitted to each other, whereby the terminal plate 50A is fixed to the end surface 81*a* of the divided yoke 81.

As described above, in the coil unit 70A, with the end surface 81*a* of the divided yoke 81 and the first main surface 51*a* of the plate portion 51 being fitted to each other at the fitting portion 90A, the terminal plate 50A is easily fixed to the end surface 81*a* of the divided yoke 81, and the terminal plate 50A is easily positioned.

In the divided core 80A, the recesses 86*b* and 86*c* are provided to the end surface 81*a* of the divided yoke 81, and the recesses 86*b* and 86*c* are molded simultaneously with the molding of the divided core 80A. Namely, when the coil unit 70A is manufactured, it is not necessary to perform additional processing on the molded divided core 80A in order to provide the recesses 86*b* and 86*c* to the end surface 81*a* of the divided yoke 81. This suppresses lowering in the manufacturing efficiency of the coil unit 70A.

Further, when the coil unit 70A is manufactured, damage to the divided core 80A is avoided when the recesses 86*b* and 86*c* are provided to the end surface 81*a* of the divided yoke 81. This suppresses lowering in the strength of the coil unit 70A (more specifically, divided core 80A).

Consequently, in the stator 20A in which the plurality of coil units 70A are arranged in the annular shape in the circumferential direction, even when the recesses 86*b* and 86*c* are provided, lowering in manufacturing efficiency and lowering in strength are suppressed.

In contrast, in the case that the busbar is fixed to the stator core by screwing as in the electric motor described in the '408 Application, additional processing for forming a screw hole in the stator core is required after the stator core is manufactured, and therefore, the manufacturing efficiency lowers. Further, since the stator core is damaged when the screw hole is formed, the strength of the stator core lowers. For example, when the stator core is formed of a powder magnetic core, forming a screw hole itself in the stator core is hard because the powder magnetic core is fragile.

The recesses 86*b* and 86*c* provided to the end surface 81*a* of the divided yoke 81 function when the first main surface 51*a* of the plate portion 51 and the end surface 81*a* of the divided yoke 81 are fitted to each other, even in a case that the recesses 86*b* and 86*c* are shallower than the screw hole described in the '408 Application, for example. In the coil unit 70A, therefore, even when the recesses 86*b* and 86*c* are provided to the end surface 81*a* of the divided yoke 81, the influence on magnetic characteristics is minimized. Consequently, in the stator 20A in which the plurality of coil units 70A are annularly arranged in the circumferential direction, even when the recesses 86*b* and 86*c* are provided, the influence on magnetic characteristics is minimized.

In the stator of the present disclosure, the winding wire extends, for example, toward the terminal portion to be in contact with the protrusion on a side of one end portion.

In the coil unit 70A in FIG. 2, the winding wire 41 extends toward the terminal portion 52*a* to be in contact with the protrusion 55*b* on a side of the one end portion 41*a*.

At a boundary between the end surface 81*a* of the divided yoke 81 and an inner circumferential surface of the divided yoke 81, roughness increases in the manufacturing process of the divided core 80A, and burrs may be formed. When the one end portion 41*a* of the winding wire 41 is extended to the terminal portion 52*a*, in a case that the winding wire 41 is in contact with the boundary between the end surface 81*a* of the divided yoke 81 and the inner circumferential surface of the divided yoke 81 on the side of the one end portion 41*a*, insulation coating of the winding wire 41 may be broken due to the burrs described above or the like.

In contrast, in the coil unit 70A in FIG. 2, the winding wire 41 extends toward the terminal portion 52*a* to be in contact with the protrusion 55*b* on the side of the one end portion 41*a*. Thus, when the one end portion 41*a* of the winding wire 41 is extended to the terminal portion 52*a*, the winding wire 41 may elude the boundary between the end surface 81*a* of the divided yoke 81 and the inner circumferential surface of the divided yoke 81 on the side of the one end portion 41*a*. This prevents the insulation coating of the winding wire 41 from being broken.

In the coil unit 70A in FIG. 2, the winding wire 41 extends, for example, toward the terminal portion 52*b* to be in contact with the protrusion 55*c* on a side of the other end portion 41*b*. In the case above, when the other end portion 41*b* of the winding wire 41 is extended to the terminal portion 52*b*, the winding wire 41 may elude the boundary between the end surface 81*a* of the divided yoke 81 and the inner circumferential surface of the divided yoke 81 on the side of the other end portion 41*b*. This prevents the insulation coating of the winding wire 41 from being broken.

In the stator of the present disclosure, an inner end of the terminal plate is not positioned in an inner side portion than an inner end of the yoke in the radial direction, for example.

In the coil unit 70A in FIG. 2, an inner end of the terminal plate 50A is not positioned in an inner side portion than an inner end of the divided yoke 81 (more specifically, end surface 81*a* of divided yoke 81) in the radial direction. As described above, as compared with a case that the inner end of the terminal plate 50A is positioned in the inner side portion than the inner end of the divided yoke 81 in the radial direction, the one end portion 41*a* of the winding wire 41 is easily bound around the terminal portion 52*a*, and further, the other end portion 41*b* of the winding wire 41 is easily bound around the terminal portion 52*b*.

In the coil unit 70A, as an aspect in which the inner end of the terminal plate 50A is not positioned in the inner side portion than the inner end of the divided yoke 81 in the radial direction, in the radial direction, the inner end of the terminal plate 50A may be positioned at the same position as that of the inner end of the divided yoke 81 as illustrated in FIG. 2, or may be positioned in an outer side portion relative to the inner end of the divided yoke 81.

In the coil unit 70A, in the radial direction, the outer end of the terminal plate 50A may be positioned in an inner side portion relative to an outer end of the divided yoke 81 (more specifically, end surface 81*a* of divided yoke 81), at the same position as the outer end of the divided yoke 81, or in an outer side portion relative to the outer end of the divided yoke 81.

In the coil unit 70A, as illustrated in FIG. 2, the outer end of the terminal plate 50A, for example, is not positioned in the outer side portion than the outer end of the divided yoke 81 (more specifically, end surface 81*a* of divided yoke 81) in the circumferential direction. As described above, as compared with a case that the outer end of the terminal plate 50A is positioned in the outer side portion than the outer end of the divided yoke 81 in the circumferential direction, when the stator 20A is manufactured, the plurality of coil units 70A are annularly arranged in the circumferential direction without interference with each other with ease.

In the coil unit 70A, as an aspect in which the outer end of the terminal plate 50A is not positioned in the outer side portion than the outer end of the divided yoke 81 in the circumferential direction, the outer end of the terminal plate 50A may be positioned at the same position as the outer end of the divided yoke 81 as illustrated in FIG. 2, or may be positioned in an inner side portion relative to the outer end of the divided yoke 81 in the circumferential direction.

In the stator of the present disclosure, the fitting portion to fit the end surface of the yoke and the first main surface of the plate portion is not limited to the aspect illustrated in FIG. 4. Other aspects of the fitting portion to fit the end surface of the yoke and the first main surface of the plate portion will be described below with reference to other aspects.

Figure 5:
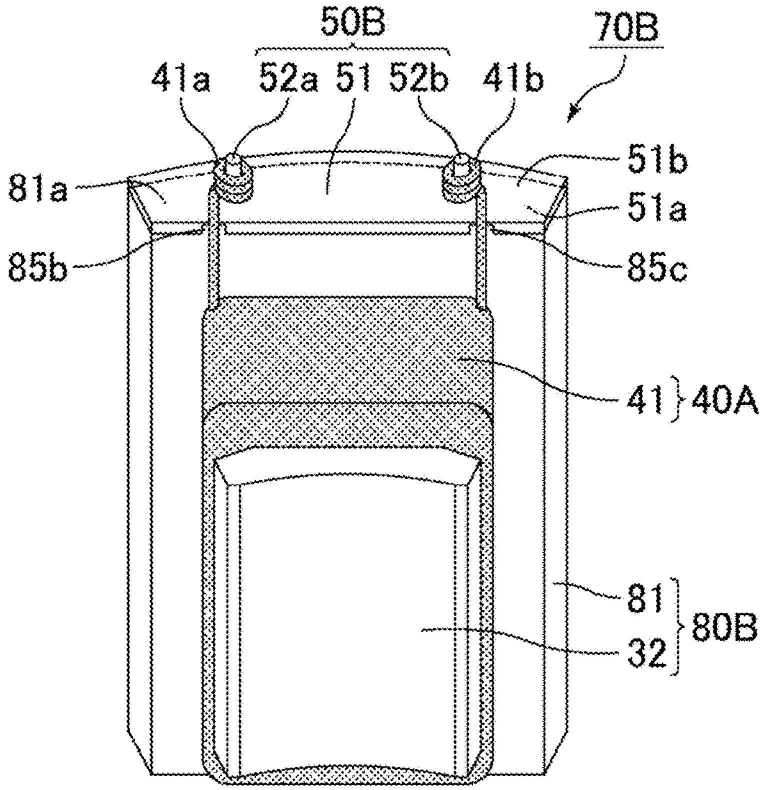
FIG. 5 is a schematic perspective view of a coil unit providing an example of a stator in accordance with aspects of the present disclosure.
Figure 6:
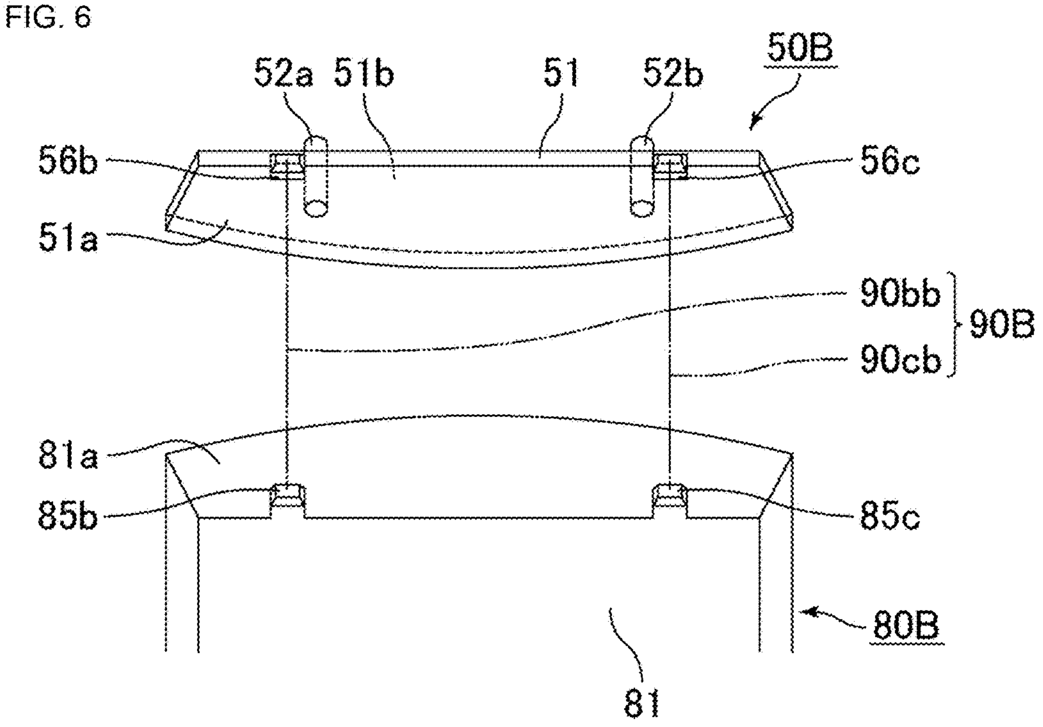
FIG. 6 is a schematic perspective view of an example of a state in which a divided core and a terminal plate in FIG. 5 are disassembled.

FIG. 5 is a schematic perspective view of a coil unit providing an example of a stator according to an aspect of the present disclosure. FIG. 6 is a schematic perspective view of a state in which a divided core and a terminal plate in FIG. 5 are disassembled.

A coil unit 70B in FIG. 5 includes a divided core 80B, the coil 40A, and a terminal plate 50B.

As illustrated in FIG. 6, the divided yoke 81 of the divided core 80B is provided with protrusions 85*b* and 85*c* that protrude from the end surface 81*a* in the axial direction.

The protrusions 85*b* and 85*c* are provided to the peripheral edge of the end surface 81*a* of the divided yoke 81.

The protrusion 85*b* is separated from the protrusion 85*c* in the circumferential direction.

The three-dimensional shapes of the protrusions 85*b* and 85*c* may be the same or may be different from each other.

As illustrated in FIG. 6, the plate portion 51 of the terminal plate 50B is provided with recesses 56*b* and 56*c* that are recessed from the first main surface 51*a* in the axial direction.

The recesses 56*b* and 56*c* are provided to the peripheral edge of the first main surface 51*a* of the plate portion 51.

The recess 56*b* is separated from the recess 56*c* in the circumferential direction.

The three-dimensional shapes of the recesses 56*b* and 56*c* may be the same or may be different from each other.

In the coil unit 70B, the end surface 81*a* of the divided yoke 81 and the first main surface 51*a* of the plate portion 51 are fitted to each other at a fitting portion 90B as illustrated in FIG. 6. The fitting portion 90B includes a fitting portion 90*bb* formed by fitting the protrusion 85*b* and the recess 56*b*, and a fitting portion 90*cb* formed by fitting the protrusion 85*c* and the recess 56*c*. Namely, in the coil unit 70B, the protrusion 85*b* and the recess 56*b* are fitted to each other, and the protrusion 85*c* and the recess 56*c* are fitted to each other, whereby the terminal plate 50B is fixed to the end surface 81*a* of the divided yoke 81.

As described above, in the coil unit 70B, with the end surface 81*a* of the divided yoke 81 and the first main surface 51*a* of the plate portion 51 being fitted to each other at the fitting portion 90B, the terminal plate 50B is easily fixed to the end surface 81*a* of the divided yoke 81, and the terminal plate 50B is easily positioned.

In the divided core 80B, the protrusions 85*b* and 85*c* are provided to the end surface 81*a* of the divided yoke 81, and the protrusions 85*b* and 85*c* are molded simultaneously with the molding of the divided core 80B. Namely, when the coil unit 70B is manufactured, it is not necessary to perform additional processing on the molded divided core 80B in order to provide the protrusions 85*b* and 85*c* to the end surface 81*a* of the divided yoke 81. This suppresses lowering in the manufacturing efficiency of the coil unit 70B, and further, suppresses lowering in the strength of the coil unit 70B (more specifically, divided core 80B).

Figure 7:
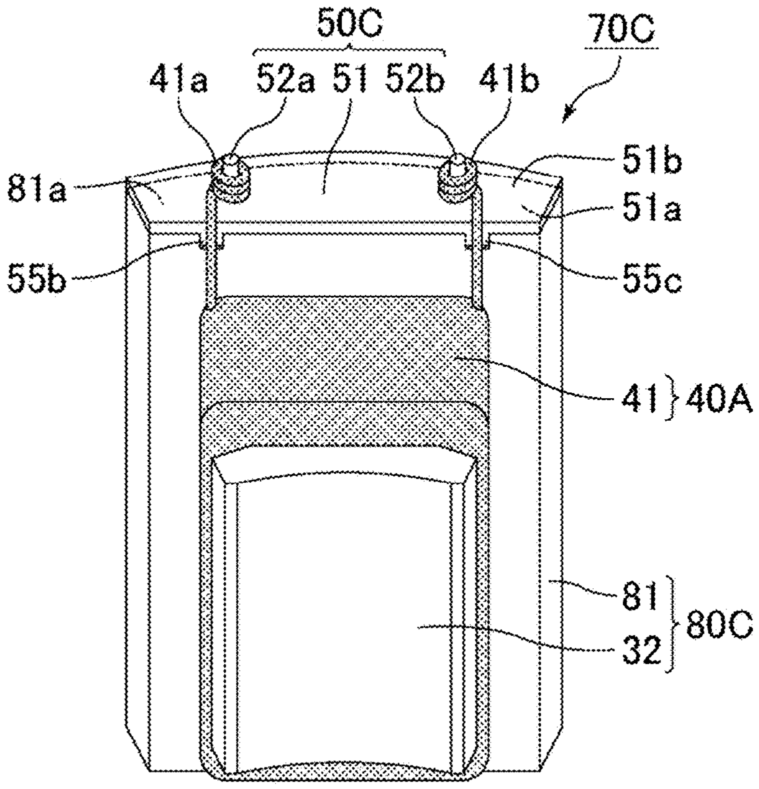
FIG. 7 is a schematic perspective view of a coil unit providing an example of a stator in accordance with aspects of the present disclosure.
Figure 8:
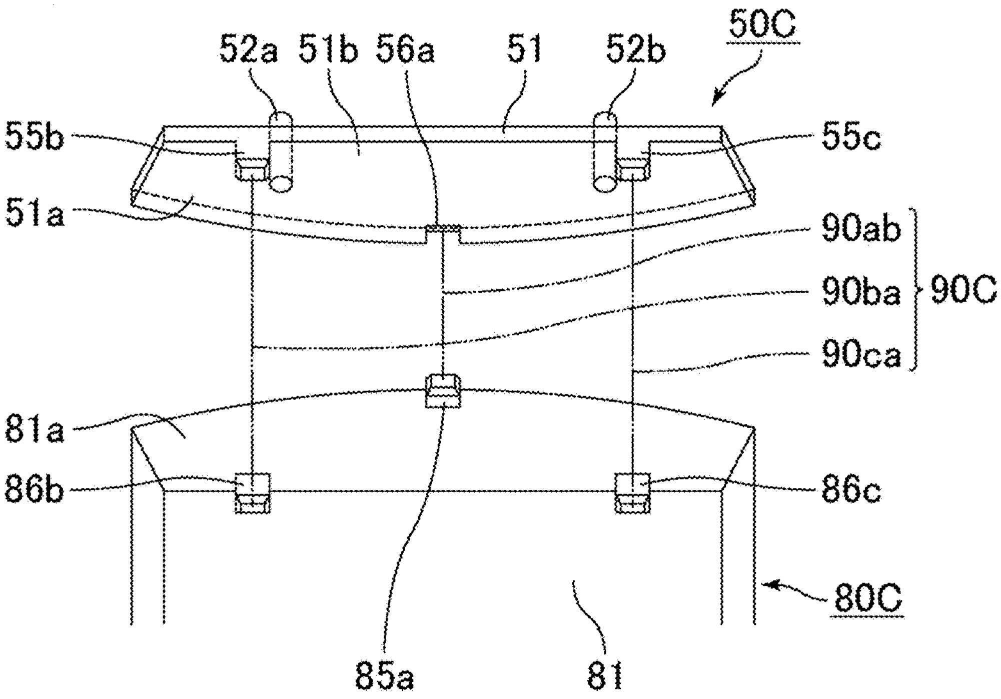
FIG. 8 is a schematic perspective view of an example of a state in which a divided core and a terminal plate in FIG. 7 are disassembled.

FIG. 7 is a schematic perspective view of a coil unit providing an example of a stator according to another aspect of the present disclosure. FIG. 8 is a schematic perspective view of a state in which a divided core and a terminal plate in FIG. 7 are disassembled.

A coil unit 70C in FIG. 7 includes a divided core 80C, the coil 40A, and a terminal plate 50C.

As illustrated in FIG. 8, the divided yoke 81 of the divided core 80C is provided with a protrusion 85*a* that protrudes from the end surface 81*a* in the axial direction. Further, the divided yoke 81 of the divided core 80C is provided with the recesses 86*b* and 86*c* that are recessed from the end surface 81*a* in the axial direction.

The protrusion 85*a*, the recess 86*b*, and the recess 86*c* are provided to the peripheral edge of the end surface 81*a* of the divided yoke 81.

The protrusion 85*a* is positioned in an inner side portion than the recesses 86*b* and 86*c* in the circumferential direction. The protrusion 85*a* is positioned in an outer side portion than the recesses 86*b* and 86*c* in the radial direction.

The recess 86*b* is positioned in an outer side portion than the protrusion 85*a* in the circumferential direction. The recess 86*b* is positioned in an inner side portion than the protrusion 85*a* in the radial direction. Further, the recess 86*b* is separated from the recess 86*c* in the circumferential direction.

The recess 86*c* is positioned in the outer side portion than the protrusion 85*a* in the circumferential direction. The recess 86*c* is positioned in the inner side portion than the protrusion 85*a* in the radial direction.

The three-dimensional shapes of the recesses 86*b* and 86*c* may be the same or may be different from each other.

As illustrated in FIG. 8, the plate portion 51 of the terminal plate 50C is provided with a recess 56*a* that is recessed from the first main surface 51*a* in the axial direction. Further, the plate portion 51 of the terminal plate 50C is provided with the protrusions 55*b* and 55*c* that protrude from the first main surface 51*a* in the axial direction.

The recess 56*a*, the protrusion 55*b*, and the protrusion 55*c* are provided to the peripheral edge of the first main surface 51*a* of the plate portion 51.

The recess 56*a* is positioned in an inner side portion than the protrusions 55*b* and 55*c* in the circumferential direction. The recess 56*a* is positioned in an outer side portion than the protrusions 55*b* and 55*c* in the radial direction.

The protrusion 55*b* is positioned in an outer side portion than the recess 56*a* in the circumferential direction. The protrusion 55*b* is positioned in an inner side portion than the recess 56*a* in the radial direction. Further, the protrusion 55*b* is separated from the protrusion 55*c* in the circumferential direction.

The protrusion 55*c* is positioned in the outer side portion than the recess 56*a* in the circumferential direction. The protrusion 55*c* is positioned in the inner side portion than the recess 56*a* in the radial direction.

The three-dimensional shapes of the protrusions 55*b* and 55*c* may be the same or may be different from each other.

In the coil unit 70C, the end surface 81*a* of the divided yoke 81 and the first main surface 51*a* of the plate portion 51 are fitted to each other at a fitting portion 90C as illustrated in FIG. 8. The fitting portion 90C includes a fitting portion 90*ab* formed by fitting the protrusion 85*a* and the recess 56*a*, a fitting portion 90*ba* formed by fitting the recess 86*b* and the protrusion 55*b*, and a fitting portion 90*ca* formed by fitting the recess 86*c* and the protrusion 55*c*. Namely, in the coil unit 70C, the protrusion 85*a* and the recess 56*a* are fitted to each other, the recess 86*b* and the protrusion 55*b* are fitted to each other, and the recess 86*c* and the protrusion 55*c* are fitted to each other, whereby the terminal plate 50C is fixed to the end surface 81*a* of the divided yoke 81.

As described above, in the coil unit 70C, with the end surface 81*a* of the divided yoke 81 and the first main surface 51*a* of the plate portion 51 being fitted to each other at the fitting portion 90C, the terminal plate 50C is easily fixed to the end surface 81*a* of the divided yoke 81, and the terminal plate 50C is easily positioned.

In the divided core 80C, the protrusion 85*a*, the recess 86*b*, and the recess 86*c* are provided to the end surface 81*a* of the divided yoke 81, and the protrusion 85*a*, the recess 86*b*, and the recess 86*c* are molded simultaneously with the molding of the divided core 80C. Namely, when the coil unit 70C is manufactured, it is not necessary to perform additional processing on the molded divided core 80C in order to provide the protrusion 85*a*, the recess 86*b*, and the recess 86*c* to the end surface 81*a* of the divided yoke 81. This suppresses lowering in the manufacturing efficiency of the coil unit 70C, and further, suppresses lowering in the strength of the coil unit 70C (more specifically, divided core 80C).

In the stator of the present disclosure, the fitting portion may overlap with the peripheral edge of the end surface of the yoke and the peripheral edge of the first main surface of the plate portion in the axial direction.

The fitting portion 90C in FIG. 8, here, the fitting portion 90*ab*, the fitting portion 90*ba*, and the fitting portion 90*ca* each overlap with the peripheral edge of the end surface 81*a* of the divided yoke 81 and the peripheral edge of the first main surface 51*a* of the plate portion 51 in the axial direction.

In the stator according to the present disclosure, the fitting portion, for example, includes a first fitting portion and a second fitting portion positioned in an inner side portion than the first fitting portion in the radial direction.

The fitting portion 90C in FIG. 8 includes the fitting portion 90*ab*, and the fitting portion 90*ba* and the fitting portion 90*ca* positioned in an inner side portion than the fitting portion 90*ab* in the radial direction. Namely, in the fitting portion 90C, the fitting portion 90*ab* corresponds to the first fitting portion, and the fitting portion 90*ba* or the fitting portion 90*ca* corresponds to the second fitting portion. As described above, with the fitting portions to fit the end surface 81*a* of the divided yoke 81 and the first main surface 51*a* of the plate portion 51 being independently provided to be separated in the radial direction, the terminal plate 50C is less likely to be displaced from the end surface 81*a* of the divided yoke 81.

In the stator according to the present disclosure, the fitting portion, for example, further includes a third fitting portion that is positioned in an inner side portion than the first fitting portion in the radial direction and is separated from the second fitting portion in the circumferential direction.

The fitting portion 90C in FIG. 8 includes the fitting portion 90*ba* and the fitting portion 90*ca* that are positioned in the inner side portion than the fitting portion 90*ab* in the radial direction and are separated from each other in the circumferential direction. Namely, in the fitting portion 90C, the fitting portion 90*ab* corresponds to the first fitting portion, one of the fitting portions 90*ba* and 90*ca* corresponds to the second fitting portion, and the other of the fitting portions 90*ba* and 90*ca* corresponds to the third fitting portion. As described above, with the fitting portions to fit the end surface 81*a* of the divided yoke 81 and the first main surface 51*a* of the plate portion 51 being independently provided to be separated in the radial direction and the circumferential direction, the terminal plate 50C is very unlikely to be displaced from the end surface 81*a* of the divided yoke 81.

Although FIG. 8 exemplifies an aspect in which three fitting portions are provided in one set of the divided yoke 81 and the plate portion 51, the total number of fitting portions is not particularly limited. Namely, in one set of the divided yoke 81 and the plate portion 51, one fitting portion may be provided, or the plurality of fitting portions may be provided.

FIG. 8 exemplifies an aspect in which, in one set of the divided yoke 81 and the plate portion 51, one fitting portion is provided in the outer side portion in the radial direction and two fitting portions are provided in the inner side portion in the radial direction. However, the number of fitting portions in the outer side portion and in the inner side portion in the radial direction is not particularly limited. For example, in one set of the divided yoke 81 and the plate portion 51, it is acceptable that at least one fitting portion is provided in the outer side portion in the radial direction and at least one fitting portion is provided in the inner side portion in the radial direction. In the case above, the number of fitting portions in one set of the divided yoke 81 and the plate portion 51 may be the same or different between in the outer side portion and in the inner side portion in the radial direction. Note, in the one set of the divided yoke 81 and the plate portion 51, the fitting portion is not necessarily provided in one of the outer side portion and the inner side portion in the radial direction.

Although FIG. 8 exemplifies an aspect in which the fitting portions to fit the end surface 81*a* of the divided yoke 81 and the first main surface 51*a* of the plate portion 51 are provided to be separated in the radial direction, the fitting portions are not necessarily provided to be separated in the radial direction.

Although FIG. 8 exemplifies an aspect in which the fitting portions to fit the end surface 81*a* of the divided yoke 81 and the first main surface 51*a* of the plate portion 51 are provided to be separated in the circumferential direction, the fitting portions are not necessarily provided to be separated in the circumferential direction.

Figure 9:
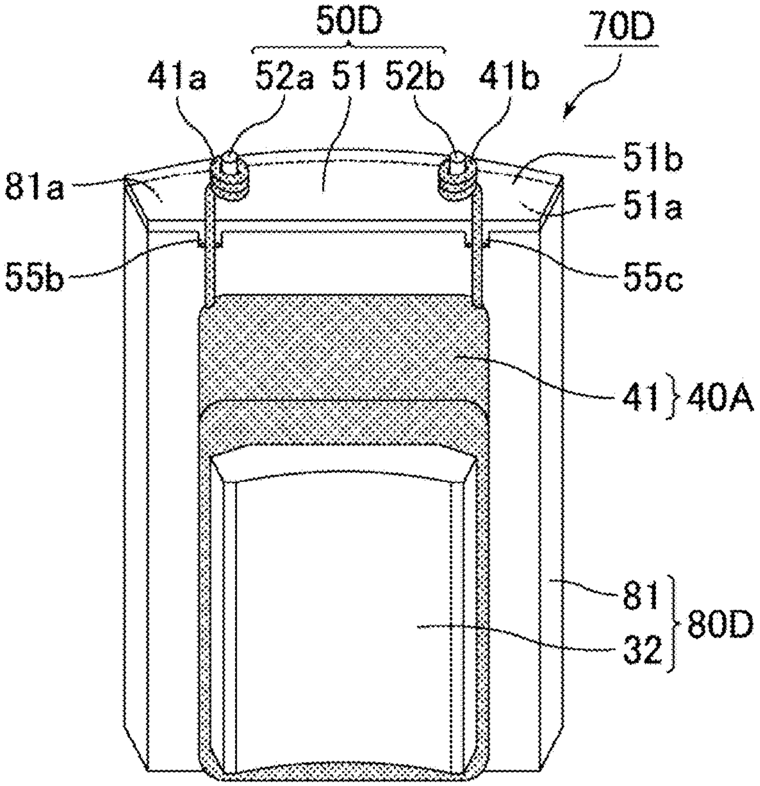
FIG. 9 is a schematic perspective view of a coil unit providing an example of a stator in accordance with aspects of the present disclosure.
Figure 10:
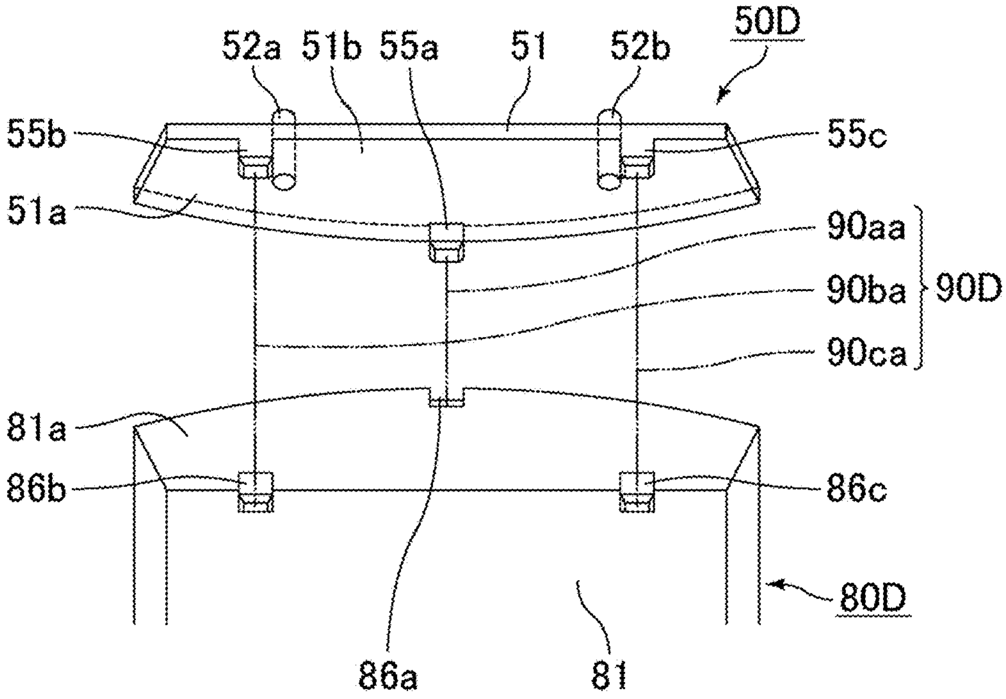
FIG. 10 is a schematic perspective view of a state in which a divided core and a terminal plate in FIG. 9 are disassembled.

FIG. 9 is a schematic perspective view of a coil unit providing an example of a stator according to an aspect of the present disclosure. FIG. 10 is a schematic perspective view of a state in which a divided core and a terminal plate in FIG. 9 are disassembled.

A coil unit 70D in FIG. 9 includes a divided core 80D, the coil 40A, and a terminal plate 50D.

As illustrated in FIG. 10, the divided yoke 81 of the divided core 80D is provided with a recess 86*a*, and the recesses 86*b* and 86*c* that are recessed from the end surface 81*a* in the axial direction.

The recesses 86*a*, 86*b*, and 86*c* are provided to the peripheral edge of the end surface 81*a* of the divided yoke 81.

The recess 86*a* is positioned in an inner side portion than the recesses 86*b* and 86*c* in the circumferential direction. The recess 86*a* is positioned in an outer side portion than the recesses 86*b* and 86*c* in the radial direction.

The recess 86*b* is positioned in an outer side portion than the recess 86*a* in the circumferential direction. The recess 86*b* is positioned in an inner side portion than the recess 86*a* in the radial direction. Further, the recess 86*b* is separated from the recess 86*c* in the circumferential direction.

The recess 86*c* is positioned in the outer side portion than the recess 86*a* in the circumferential direction. The recess 86*c* is positioned in the inner side portion than the recess 86*a* in the radial direction.

The three-dimensional shapes of the recesses 86*a*, 86*b*, and 86*c* may be the same, may be different from each other, or may be partially different from each other.

As illustrated in FIG. 10, the plate portion 51 of the terminal plate 50D is provided with a protrusion 55*a*, and the protrusions 55*b* and 55*c* that protrude from the first main surface 51*a* in the axial direction.

The protrusions 55*a*, 55*b*, and 55*c* are provided to the peripheral edge of the first main surface 51*a* of the plate portion 51.

The protrusion 55*a* is positioned in the inner side portion than the protrusions 55*b* and 55*c* in the circumferential direction. The protrusion 55*a* is positioned in the outer side portion than the protrusions 55*b* and 55*c* in the radial direction.

The protrusion 55*b* is positioned in an outer side portion than the protrusion 55*a* in the circumferential direction. The protrusion 55*b* is positioned in an inner side portion than the protrusion 55*a* in the radial direction. Further, the protrusion 55*b* is separated from the protrusion 55*c* in the circumferential direction.

The protrusion 55*c* is positioned in the outer side portion than the protrusion 55*a* in the circumferential direction. The protrusion 55*c* is positioned in the inner side portion than the protrusion 55*a* in the radial direction.

The three-dimensional shapes of the protrusions 55*a*, 55*b*, and 55*c* may be the same, may be different from each other, or may be partially different from each other.

In the coil unit 70D, the end surface 81*a* of the divided yoke 81 and the first main surface 51*a* of the plate portion 51 are fitted to each other at a fitting portion 90D as illustrated in FIG. 10. The fitting portion 90D includes a fitting portion 90*aa* formed by fitting the recess 86*a* and the protrusion 55*a*, the fitting portion 90*ba* formed by fitting the recess 86*b* and the protrusion 55*b*, and the fitting portion 90*ca* formed by fitting the recess 86*c* and the protrusion 55*c*. Namely, in the coil unit 70D, the recess 86*a* and the protrusion 55*a* are fitted to each other, the recess 86*b* and the protrusion 55*b* are fitted to each other, and the recess 86*c* and the protrusion 55*c* are fitted to each other, whereby the terminal plate 50D is fixed to the end surface 81*a* of the divided yoke 81.

As described above, in the coil unit 70D, with the end surface 81*a* of the divided yoke 81 and the first main surface 51*a* of the plate portion 51 being fitted to each other at the fitting portion 90D, the terminal plate 50D is easily fixed to the end surface 81*a* of the divided yoke 81, and the terminal plate 50D is easily positioned.

In the divided core 80D, the recesses 86*a*, 86*b*, and 86*c* are provided to the end surface 81*a* of the divided yoke 81, and the recesses 86*a*, 86*b*, and 86*c* are molded simultaneously with the molding of the divided core 80D. Namely, when the coil unit 70D is manufactured, it is not necessary to perform additional processing on the molded divided core 80D in order to provide the recesses 86*a*, 86*b*, and 86*c* to the end surface 81*a* of the divided yoke 81. This suppresses lowering in the manufacturing efficiency of the coil unit 70D, and further, suppresses lowering in the strength of the coil unit 70D (more specifically, divided core 80D).

In the stator of the present disclosure, the configuration of the fitting portion to fit the end surface of the yoke and the first main surface of the plate portion may be a configuration other than aspects described above.

In the stator of the present disclosure, the fitting portion may overlap with the terminal portion in the axial direction.

In the stator of the present disclosure, when the fitting portion overlaps with the terminal portion in the axial direction, the protrusion is provided, for example, to protrude from the first main surface of the plate portion in the axial direction, and the recess is provided, for example, to be recessed from the end surface of the yoke in the axial direction.

Figure 11:
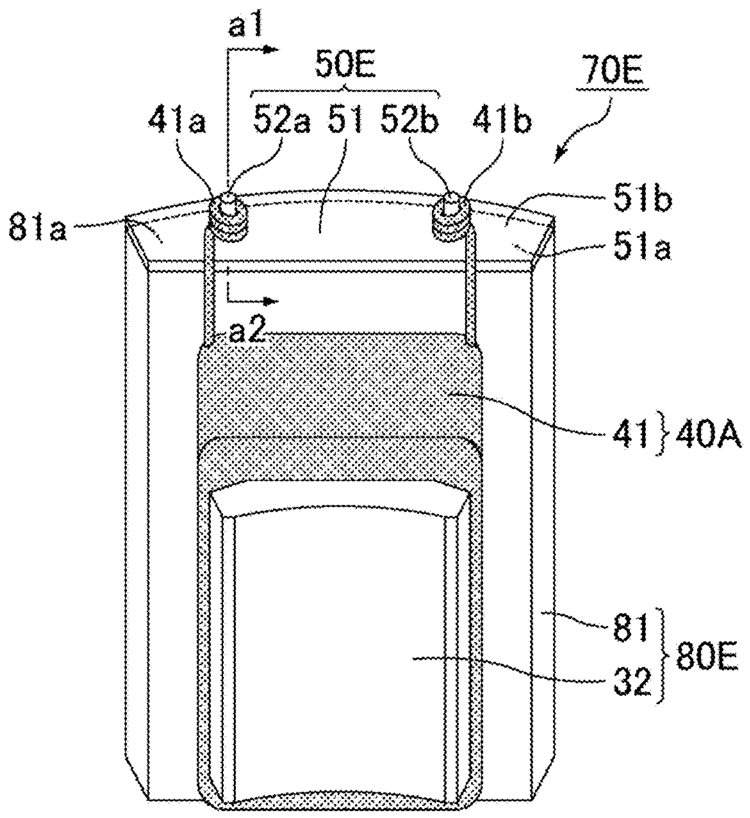
FIG. 11 is a schematic perspective view of a coil unit providing an example of a stator in accordance with aspects of the present disclosure.
Figure 12:
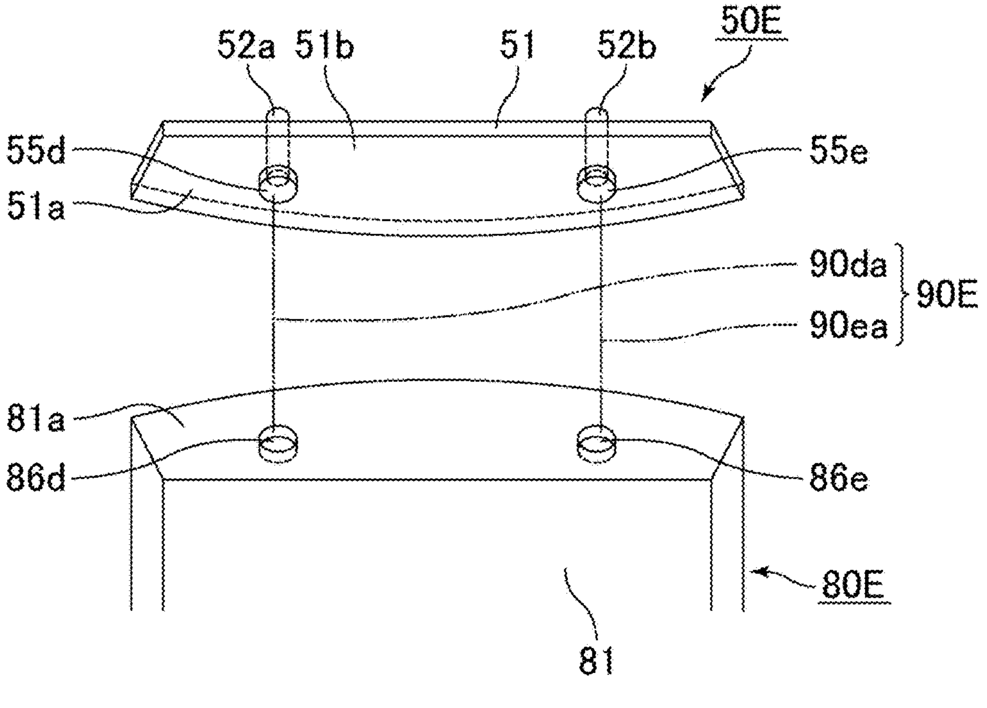
FIG. 12 is a schematic perspective view of an example of a state in which a divided core and a terminal plate in FIG. 11 are disassembled.
Figure 13:
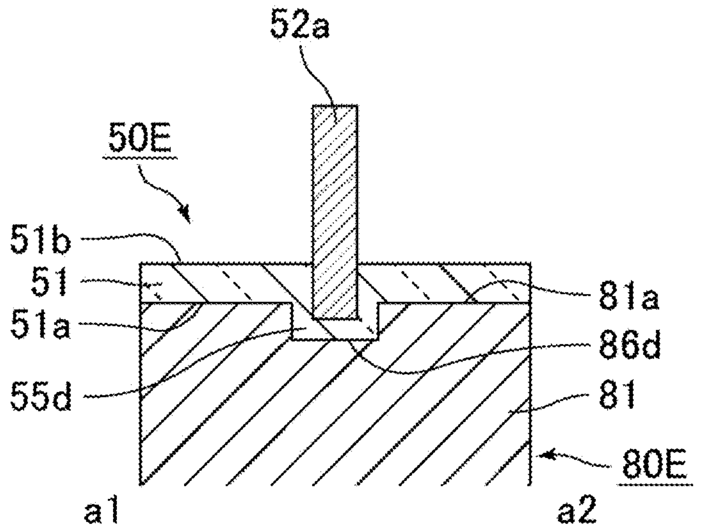
FIG. 13 is a schematic sectional view of an example of a section of the coil unit (excluding winding wire) in FIG. 11 taken along a line segment a1 to a2.

FIG. 11 is a schematic perspective view of a coil unit providing an example of a stator according to aspects of the present disclosure. FIG. 12 is a schematic perspective view of a state in which a divided core and a terminal plate in FIG. 11 are disassembled. FIG. 13 is a schematic sectional view of an example of a section of the coil unit (excluding winding wire) in FIG. 11 taken along a line segment a1 to a2.

A coil unit 70E in FIG. 11 includes a divided core 80E, the coil 40A, and a terminal plate 50E.

As illustrated in FIG. 12, the divided yoke 81 of the divided core 80E is provided with recesses 86*d* and 86*e* that are recessed from the end surface 81*a* in the axial direction.

The recesses 86*d* and 86*e* are separated from each other in the circumferential direction.

The three-dimensional shapes of the recesses 86*d* and 86*e* may be the same or may be different from each other.

As illustrated in FIG. 12, the plate portion 51 of the terminal plate 50E is provided with protrusions 55*d* and 55*e* that protrude from the first main surface 51*a* in the axial direction.

The protrusion 55*d* overlaps with the terminal portion 52*a* in the axial direction.

The protrusion 55*e* overlaps with the terminal portion 52*b* in the axial direction.

The protrusions 55*d* and 55*e* are separated from each other in the circumferential direction.

The three-dimensional shapes of the protrusions 55*d* and 55*e* may be the same or may be different from each other.

In the coil unit 70E, the end surface 81*a* of the divided yoke 81 and the first main surface 51*a* of the plate portion 51 are fitted to each other at a fitting portion 90E as illustrated in FIG. 12. The fitting portion 90E includes a fitting portion 90*da* formed by fitting the recess 86*d* and the protrusion 55*d*, and a fitting portion 90*ea* formed by fitting the recess 86*e* and the protrusion 55*e*. Namely, in the coil unit 70E, the recess 86*d* and the protrusion 55*d* are fitted to each other, and the recess 86*e* and the protrusion 55*e* are fitted to each other, whereby the terminal plate 50E is fixed to the end surface 81*a* of the divided yoke 81.

In the fitting portion 90E, the recess 86*d* and the protrusion 55*d* overlap with each other in the axial direction in the fitting portion 90*da*, and the recess 86*e* and the protrusion 55*e* overlap with each other in the fitting portion 90*ea* in the axial direction. Conversely, as described above, in the terminal plate 50E, the protrusion 55*d* and the terminal portion 52*a* overlap with each other in the axial direction, and the protrusion 55*e* and the terminal portion 52*b* overlap with each other in the axial direction. Consequently, with respect to the positional relationship between the fitting portion 90E and the terminal plate 50E, the fitting portion 90*da* overlaps with the terminal portion 52*a* in the axial direction, and the fitting portion 90*ea* overlaps with the terminal portion 52*b* in the axial direction.

As described above, in the coil unit 70E, with the end surface 81*a* of the divided yoke 81 and the first main surface 51*a* of the plate portion 51 being fitted to each other at the fitting portion 90E, the terminal plate 50E is easily fixed to the end surface 81*a* of the divided yoke 81, and the terminal plate 50E is easily positioned.

As described above, in the coil unit 70E, by using only two fitting portions of the fitting portion 90*da* and the fitting portion 90*ea*, the terminal plate 50E may be fixed to the end surface 81*a* of the divided yoke 81, and the terminal plate 50E may be positioned.

In the divided core 80E, the recesses 86*d* and 86*e* are provided to the end surface 81*a* of the divided yoke 81, and the recesses 86*d* and 86*e* are molded simultaneously with the molding of the divided core 80E. Namely, when the coil unit 70E is manufactured, it is not necessary to perform additional processing on the molded divided core 80E in order to provide the recesses 86*d* and 86*e* to the end surface 81*a* of the divided yoke 81. This suppresses lowering in the manufacturing efficiency of the coil unit 70E, and further, suppresses lowering in the strength of the coil unit 70E (more specifically, divided core 80E).

Further, in the terminal plate 50E, since the protrusion 55*d* is provided at a position overlapping with the terminal portion 52*a* in the axial direction, a size of the terminal portion 52*a* in the axial direction, which is inserted in the plate portion 51, may be made larger as illustrated in FIG. 13, as compared with a case that the protrusion 55*d* is not provided. Thus, in the terminal plate 50E, the terminal portion 52*a* is firmly fixed to the plate portion 51. The terminal portion 52*a* firmly fixed to the plate portion 51 is less likely to wobble, and thus the work efficiency in binding the one end portion 41*a* of the winding wire 41 to the terminal portion 52*a* tends to increase.

In FIG. 13, illustrated is a section of the coil unit 70E at a position where the terminal portion 52*a* and the protrusion 55*d* overlap with each other in the axial direction, and a section at a position where the terminal portion 52*b* and the protrusion 55*e* overlap with each other in the axial direction as well is the same as that illustrated in FIG. 13, for example.

In the stator of the present disclosure, the fitting portion may be formed by fitting a recess that is recessed from the end surface of the yoke in the axial direction and the plate portion.

Figure 14:
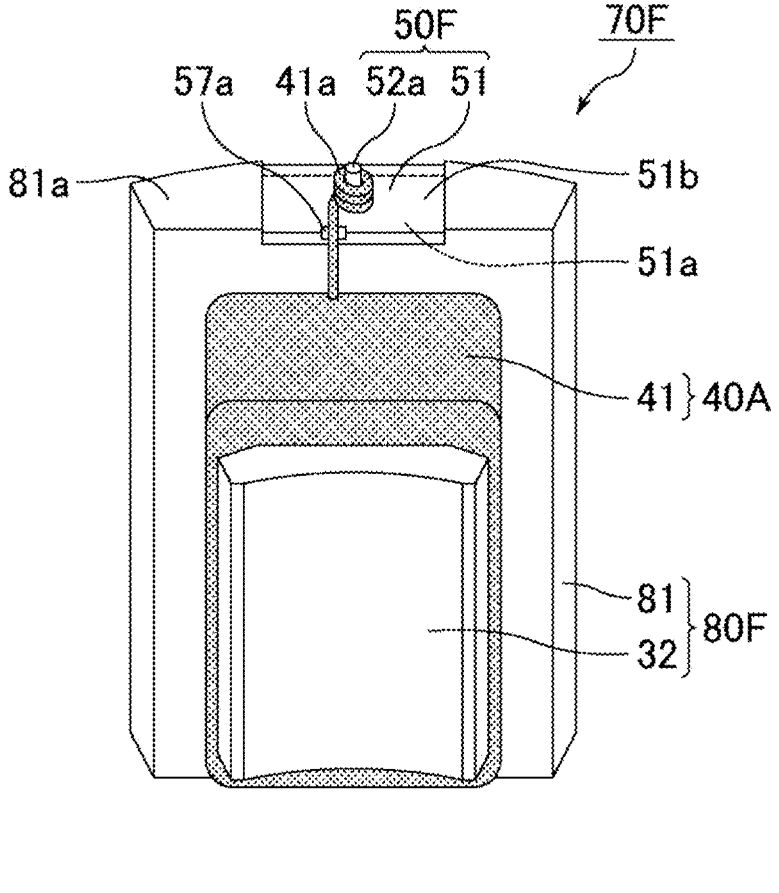
FIG. 14 is a schematic perspective view of a coil unit providing an example of a stator in accordance with aspects of the present disclosure.
Figure 15:
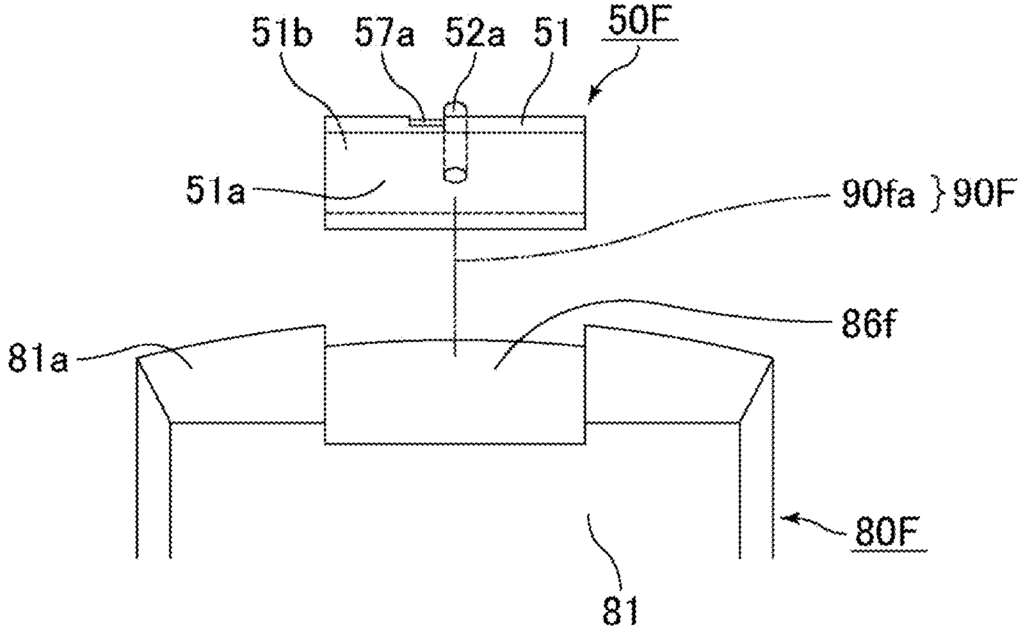
FIG. 15 is a schematic perspective view of a state in which a divided core and a terminal plate in FIG. 14 are disassembled.

FIG. 14 is a schematic perspective view of a coil unit providing an example of a stator according to an aspect of the present disclosure. FIG. 15 is a schematic perspective view of a state in which a divided core and a terminal plate in FIG. 14 are disassembled.

A coil unit 70F in FIG. 14 includes a divided core 80F, the coil 40A, and a terminal plate 50F.

As illustrated in FIG. 15, the divided yoke 81 of the divided core 80F is provided with a recess 86*f* that is recessed from the end surface 81*a* in the axial direction.

The recess 86*f* is provided from the inner circumferential surface to an outer circumferential surface of the divided yoke 81 in the radial direction.

The terminal plate 50F includes the plate portion 51 and the terminal portion 52*a*.

The one end portion 41*a* of the winding wire 41 is fixed to the terminal portion 52*a* in a state of being bound around the terminal portion 52*a*. Thus, the one end portion 41*a* of the winding wire 41 is extended to the terminal plate 50F.

In the coil unit 70F, the end surface 81*a* of the divided yoke 81 and the first main surface 51*a* of the plate portion 51 are fitted to each other at a fitting portion 90F as illustrated in FIG. 15. The fitting portion 90F is formed of a fitting portion 90*fa* formed by fitting the plate portion 51 and the recess 86*f* provided to the end surface 81*a* of the divided yoke 81. Namely, in the coil unit 70F, the recess 86*f* and the plate portion 51 are fitted to each other, whereby the terminal plate 50F is fixed to the end surface 81*a* of the divided yoke 81.

As described above, in the coil unit 70F, with the end surface 81*a* of the divided yoke 81 and the first main surface 51*a* of the plate portion 51 being fitted to each other at the fitting portion 90F, the terminal plate 50F is easily fixed to the end surface 81*a* of the divided yoke 81, and the terminal plate 50F is easily positioned.

In the divided core 80F, the recess 86*f* is provided to the end surface 81*a* of the divided yoke 81, and the recess 86*f* is molded simultaneously with the molding of the divided core 80F. Namely, when the coil unit 70F is manufactured, it is not necessary to perform additional processing on the molded divided core 80F in order to provide the recess 86*f* to the end surface 81*a* of the divided yoke 81. This suppresses lowering in the manufacturing efficiency of the coil unit 70F, and further, suppresses lowering in the strength of the coil unit 70F (more specifically, divided core 80F).

Further, the recess 86*f* provided to the end surface 81*a* of the divided yoke 81 functions when the first main surface 51*a* of the plate portion 51 and the end surface 81*a* of the divided yoke 81 are fitted to each other even in a case that the recess 86*f* is shallower than the screw hole described in the '408 Application, for example. Consequently, in the coil unit 70F, even when the recess 86*f* is provided to the end surface 81*a* of the divided yoke 81, the influence on magnetic characteristics is minimized.

Further, in the coil unit 70F, since the plate portion 51 is accommodated in the recess 86*f*, a size of the entire coil unit in the axial direction may be made smaller as compared with the coil unit 70A or the like, for example. Namely, in the coil unit 70F, reduction in thickness (reduction in height) in the axial direction is possible.

In the coil unit 70F, in the fitting portion 90F (fitting portion 90*fa*), the recess 86*f* and at least part of the plate portion 51 may be fitted to each other, and as illustrated in FIG. 15, the recess 86*f* and the entire plate portion 51 are fitted, for example, to each other. Namely, a depth of the recess 86*f* is equal, for example, to or greater than a size of the plate portion 51 in the axial direction.

Note, in the fitting portion 90F (fitting portion 90*fa*), the recess 86*f* and part of the plate portion 51 may be fitted to each other. Namely, the size of the plate portion 51 in the axial direction may be greater than the depth of the recess 86*f*.

Consequently, in the stator in which the plurality of coil units 70F are annularly arranged in the circumferential direction, reduction in thickness (reduction in height) in the axial direction is possible while minimizing the influence on the magnetic characteristics.

In the stator of the present disclosure, a winding wire recess is provided to a peripheral edge of the second main surface of the plate portion when viewed in the axial direction, and the winding wire extends toward the terminal portion to pass through the winding wire recess on the side of the one end portion, for example.

In the coil unit 70F illustrated in FIG. 14 and FIG. 15, a winding wire recess 57*a* is provided to the peripheral edge of the second main surface 51*b* of the plate portion 51 when viewed in the axial direction. The winding wire 41 extends toward the terminal portion 52*a* to pass through the winding wire recess 57*a* on the side of the one end portion 41*a*. This reduces the likelihood that the winding wire 41 is in contact with a boundary between the end surface 81*a* of the divided yoke 81 (recess 86*f*) and the inner circumferential surface of the divided yoke 81 on the side of the one end portion 41*a* when the one end portion 41*a* of the winding wire 41 is extended to the terminal portion 52*a*. Thus, there is suppressed breakage of the insulation coating of the winding wire 41 due to burrs that may be formed at the boundary between the end surface 81*a* of the divided yoke 81 (recess 86*f*) and the inner circumferential surface of the divided yoke 81.

Note, in other coil units such as the coil unit 70A, the winding wire recess may be provided to the peripheral edge of the second main surface of the plate portion when viewed in the axial direction, and the winding wire may extend toward the terminal portion to pass through the winding wire recess on the side of one end portion.

In the stator of the present disclosure, the end surface of the yoke and the first main surface of the plate portion may be bonded to each other.

Figure 16:
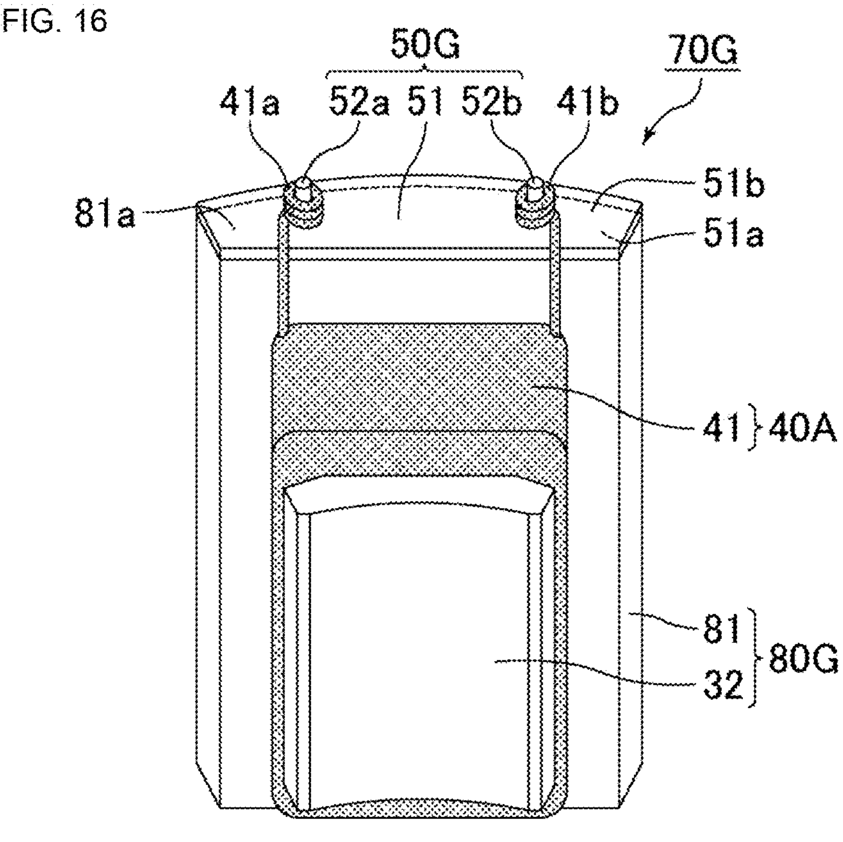
FIG. 16 is a schematic perspective view of a coil unit providing an example of a stator in accordance with aspects of the present disclosure.
Figure 17:
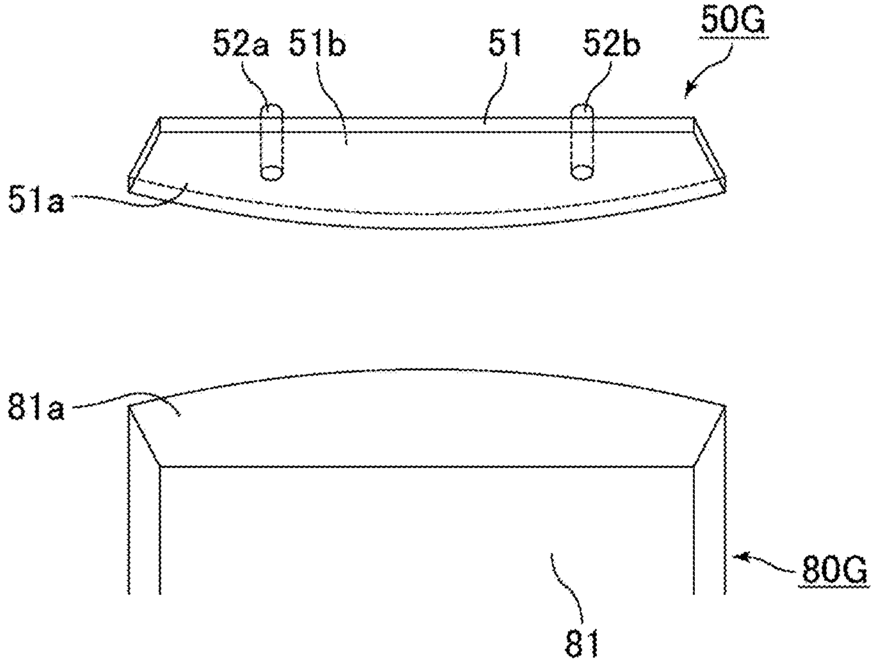
FIG. 17 is a schematic perspective view of an example of a state in which a divided core and a terminal plate in FIG. 16 are disassembled.

FIG. 16 is a schematic perspective view of a coil unit providing an example of a stator according to an aspect of the present disclosure. FIG. 17 is a schematic perspective view of a state in which a divided core and a terminal plate in FIG. 16 are disassembled.

A coil unit 70G in FIG. 16 includes a divided core 80G, the coil 40A, and a terminal plate 50G.

In the coil unit 70G, the end surface 81*a* of the divided yoke 81 and the first main surface 51*a* of the plate portion 51 are bonded to each other. Namely, the terminal plate 50G is fixed to the end surface 81*a* of the divided yoke 81 by a bonding portion (not illustrated).

Examples of the bonding portion include an adhesive.

As described above, in the coil unit 70G, the end surface 81*a* of the divided yoke 81 and the first main surface 51*a* of the plate portion 51 are bonded to each other, whereby the terminal plate 50G is easily fixed to the end surface 81*a* of the divided yoke 81, and the terminal plate 50G is easily positioned.

As described above, in the coil unit 70G, unlike the coil unit 70A or the like, with a simple structure not using a fitting portion as illustrated in FIG. 17, the terminal plate 50G may be fixed to the end surface 81*a* of the divided yoke 81, and the terminal plate 50G may be positioned.

In the aspect in which the terminal plate is fixed to the end surface of the divided yoke by using the fitting portion as in the coil unit 70A or the like, the end surface of the divided yoke and the first main surface of the plate portion may be bonded to each other in addition to being fitted to each other.

In the stator of the present disclosure, the end surface of the yoke may be provided with a dent overlapping with the terminal portion in the axial direction, and the terminal portion may be separated from a bottom surface of the dent in the axial direction.

Figure 18:
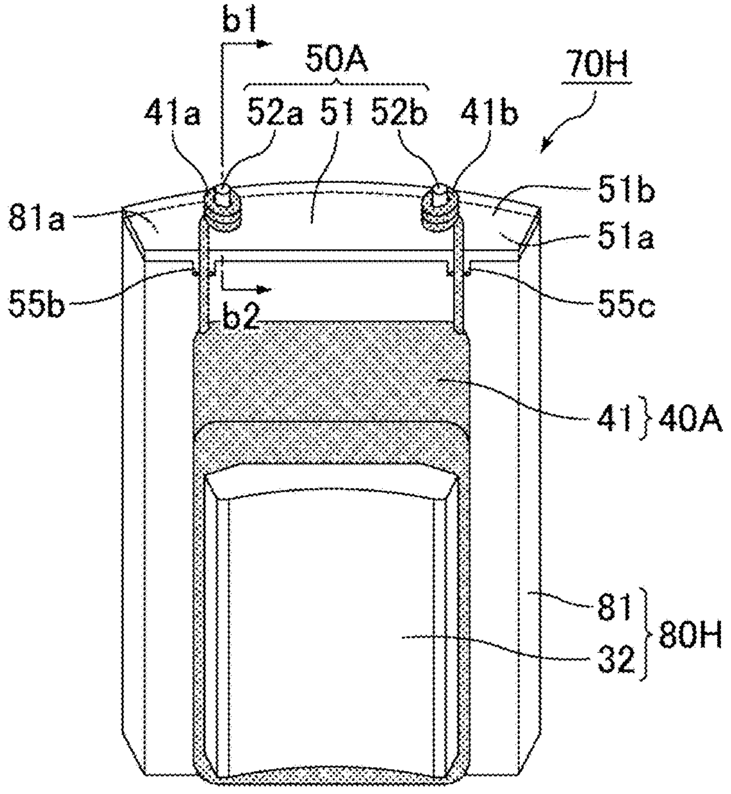
FIG. 18 is a schematic perspective view of a coil unit providing an example of a stator in accordance with aspects of the present disclosure.
Figure 19:
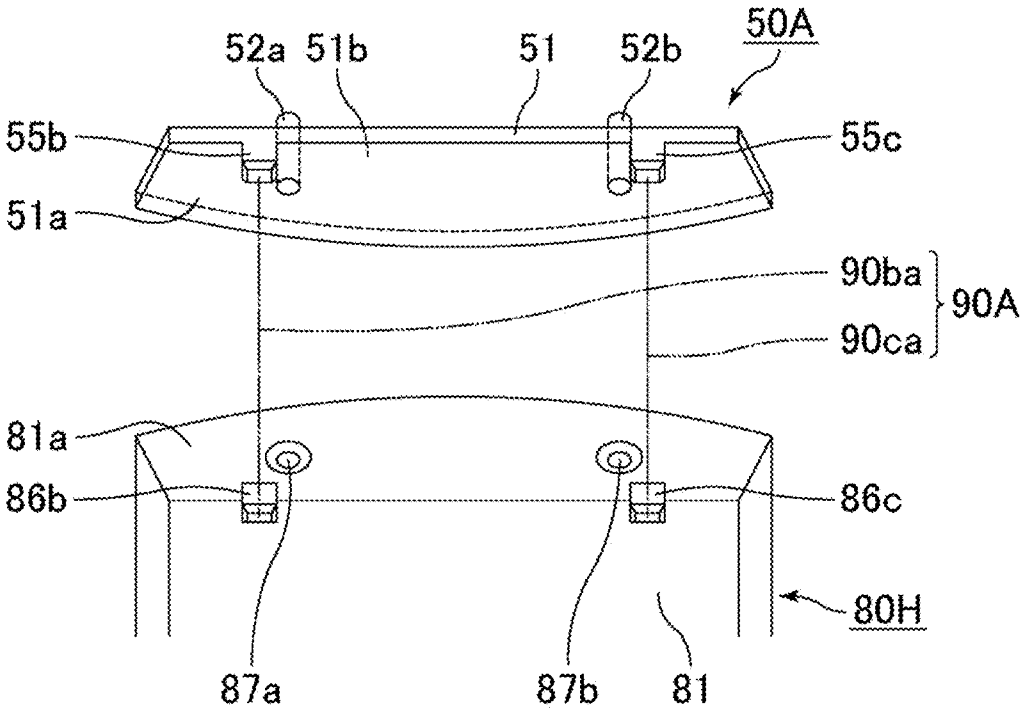
FIG. 19 is a schematic perspective view of an example of a state in which a divided core and a terminal plate in FIG. 18 are disassembled.
Figure 20:
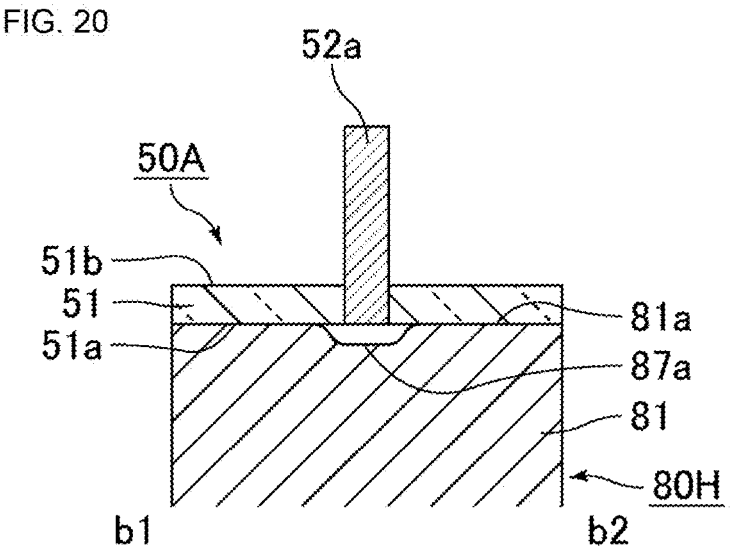
FIG. 20 is a schematic sectional view of an example of a section of the coil unit (excluding winding wire) in FIG. 18 taken along a line segment b1 to b2.

FIG. 18 is a schematic perspective view of a coil unit providing an example of a stator according to an aspect of the present disclosure. FIG. 19 is a schematic perspective view of a state in which a divided core and a terminal plate in FIG. 18 are disassembled. FIG. 20 is a schematic sectional view of an example of a section of the coil unit (excluding winding wire) in FIG. 18 taken along a line segment b1 to b2.

A coil unit 70H in FIG. 18 includes a divided core 80H, the coil 40A, and the terminal plate 50A.

As illustrated in FIG. 19, the divided yoke 81 of the divided core 80H is provided with the recesses 86*b* and 86*c* that are recessed from the end surface 81*a* in the axial direction.

As illustrated in FIG. 19, dents 87*a* and 87*b* are further provided to the end surface 81*a* of the divided yoke 81 of the divided core 80H.

The dents 87*a* and 87*b* are separated from each other in the circumferential direction.

The three-dimensional shapes of the dents 87*a* and 87*b* may be the same or may be different from each other.

The terminal plate 50A of the coil unit 70H has the same configuration as the terminal plate 50A of the coil unit 70A. Namely, as illustrated in FIG. 19, the plate portion 51 of the terminal plate 50A of the coil unit 70H is provided with the protrusions 55*b* and 55*c* that protrude from the first main surface 51*a* in the axial direction.

In the coil unit 70H, the end surface 81*a* of the divided yoke 81 and the first main surface 51*a* of the plate portion 51 are fitted to each other at the fitting portion 90A as illustrated in FIG. 19. Thus, in the coil unit 70H, the terminal plate 50A is easily fixed to the end surface 81*a* of the divided yoke 81, and the terminal plate 50A is easily positioned.

In the coil unit 70H, the dent 87*a* overlaps with the terminal portion 52*a* in the axial direction in a state that the terminal plate 50A is fixed to the end surface 81*a* of the divided yoke 81. Further, in the coil unit 70H, as illustrated in FIG. 20, the terminal portion 52*a* is separated from a bottom surface of the dent 87*a* in the axial direction in a state that the terminal plate 50A is fixed to the end surface 81*a* of the divided yoke 81. This permits to provide a structure in which the terminal portion 52*a* is not in contact with the divided yoke 81 in a state that the terminal plate 50A is fixed to the end surface 81*a* of the divided yoke 81, even when the terminal portion 52*a* is exposed from the first main surface 51*a* of the plate portion 51, and even when the terminal portion 52*a* protrudes from the first main surface 51*a* of the plate portion 51 in the axial direction. Thus, with the use of the structure illustrated in FIG. 20, insulation between the divided yoke 81 and the terminal portion 52*a* is ensured. Further, with the use of the structure illustrated in FIG. 20, as described below, when the one end portion 41*a* of the winding wire 41 is electrically coupled to a terminal of a wiring substrate by solder bonding, for example, heat generated during the solder bonding is less likely to be transferred from the terminal portion 52*a* to the divided yoke 81. As a result, since the divided core 80H is less likely to be damaged, lowering in the strength of the coil unit 70H (more specifically, divided core 80H) is suppressed.

In the coil unit 70H, the dent 87*b* overlaps with the terminal portion 52*b* in the axial direction in a state that the terminal plate 50A is fixed to the end surface 81*a* of the divided yoke 81. Further, in the coil unit 70H, the terminal portion 52*b* is separated from a bottom surface of the dent 87*b* in the axial direction in a state that the terminal plate 50A is fixed to the end surface 81*a* of the divided yoke 81, in the same way as illustrated in FIG. 20.

In the coil unit 70H, at least one of the terminal portions 52*a* and 52*b* may be separated from the bottom surface of the dent in the axial direction in a state that the terminal plate 50A is fixed to the end surface 81*a* of the divided yoke 81, and only one of the terminal portions 52*a* and 52*b* may be separated from the bottom surface of the dent in the axial direction.

In the divided core 80H, the dents 87*a* and 87*b* are provided to the end surface 81*a* of the divided yoke 81, and the dents 87*a* and 87*b* are molded simultaneously with the molding of the divided core 80H. Namely, when the coil unit 70H is manufactured, it is not necessary to perform additional processing on the molded divided core 80H in order to provide the dents 87*a* and 87*b* to the end surface 81*a* of the divided yoke 81. This suppresses lowering in the manufacturing efficiency of the coil unit 70H, and further, suppresses lowering in the strength of the coil unit 70H (more specifically, divided core 80H).

Note, in other coil units such as the coil unit 70A (excluding coil unit 70E), the end surface of the divided yoke may be provided with a dent that overlaps with the terminal portion in the axial direction, and the terminal portion may be separated from the bottom surface of the dent in the axial direction.

In the stator of the present disclosure, the terminal portion does not necessarily penetrate through the plate portion in the axial direction.

Figure 21:
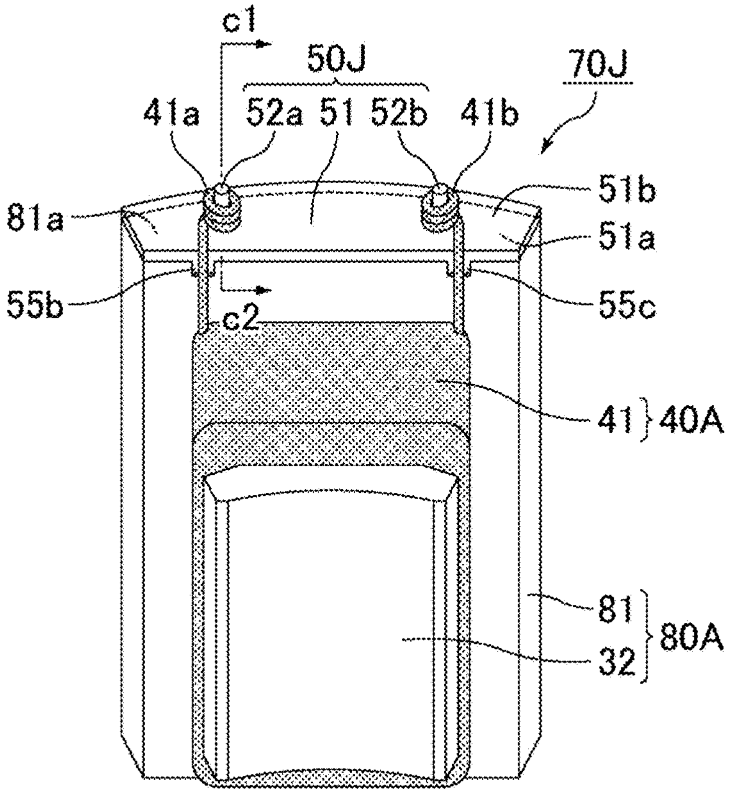
FIG. 21 is a schematic perspective view of a coil unit providing an example of a stator in accordance with aspects of the present disclosure.
Figure 22:
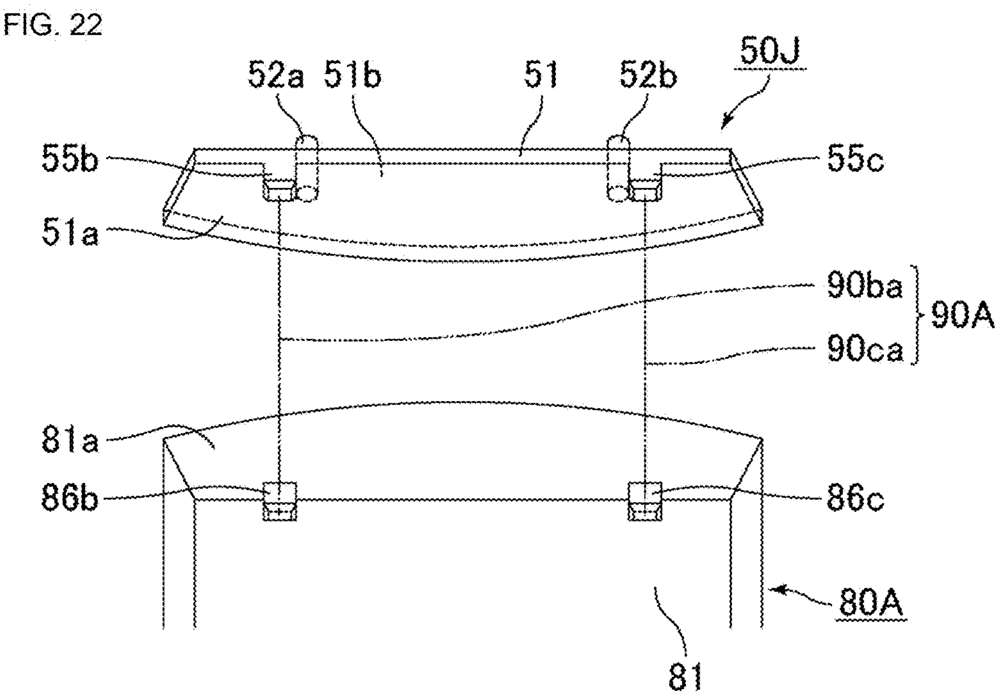
FIG. 22 is a schematic perspective view of an example of a state in which a divided core and a terminal plate in FIG. 21 are disassembled.
Figure 23:
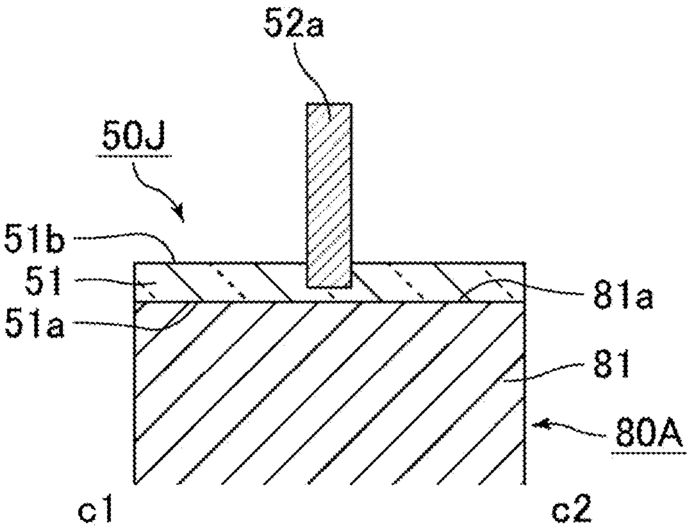
FIG. 23 is a schematic sectional view of an example of a section of the coil unit in FIG. 21 taken along a line segment c1 to c2.

FIG. 21 is a schematic perspective view of a coil unit providing an example of a stator according to an aspect of the present disclosure. FIG. 22 is a schematic perspective view of a state in which a divided core and a terminal plate in FIG. 21 are disassembled. FIG. 23 is a schematic sectional view of an example of a section of the coil unit in FIG. 21 taken along a line segment c1 to c2.

A coil unit 70J in FIG. 21 includes the divided core 80A, the coil 40A, and a terminal plate 50J.

The divided core 80A of the coil unit 70J has the same configuration as the divided core 80A of the coil unit 70A. Namely, as illustrated in FIG. 22, the divided yoke 81 of the divided core 80A included in the coil unit 70J is provided with the recesses 86*b* and 86*c* that are recessed from the end surface 81*a* in the axial direction.

The terminal plate 50J of the coil unit 70J has the same configuration as the terminal plate 50A of the coil unit 70A except that the terminal portions 52*a* and 52*b* are not exposed from the first main surface 51*a* of the plate portion 51, as described below. Namely, as illustrated in FIG. 22, the plate portion 51 of the terminal plate 50J is provided with the protrusions 55*b* and 55*c* that protrude from the first main surface 51*a* in the axial direction.

In the coil unit 70J, the end surface 81*a* of the divided yoke 81 and the first main surface 51*a* of the plate portion 51 are fitted to each other at the fitting portion 90A as illustrated in FIG. 22. Thus, in the coil unit 70J, the terminal plate 50J is easily fixed to the end surface 81*a* of the divided yoke 81, and the terminal plate 50J is easily positioned.

In the coil unit 70J, as illustrated in FIG. 23, the terminal portion 52*a* does not penetrate through the plate portion 51 in the axial direction in the terminal plate 50J. Namely, in the terminal plate 50J, the terminal portion 52*a* is not exposed from the first main surface 51*a* of the plate portion 51. This permits a structure in which the terminal portion 52*a* is not in contact with the divided yoke 81 in a state that the terminal plate 50J is fixed to the end surface 81*a* of the divided yoke 81. Thus, with the use of the structure illustrated in FIG. 23, insulation between the divided yoke 81 and the terminal portion 52*a* is ensured. Further, with the use of the structure illustrated in FIG. 23, as described below, when the one end portion 41*a* of the winding wire 41 is electrically coupled to a terminal of a wiring substrate by solder bonding, for example, heat generated during the solder bonding is less likely to be transferred from the terminal portion 52*a* to the divided yoke 81. As a result, since the divided core 80A is less likely to be damaged, lowering in the strength of the coil unit 70J (more specifically, divided core 80A) is suppressed.

In the coil unit 70J, similar to FIG. 23, the terminal portion 52*b* does not penetrate through the plate portion 51 in the axial direction in the terminal plate 50J.

In the terminal plate 50J of the coil unit 70J, it is acceptable that at least one of the terminal portions 52*a* and 52*b* does not penetrate through the plate portion 51 in the axial direction, and that only one of the terminal portions 52*a* and 52*b* does not penetrate through the plate portion 51 in the axial direction.

For example, in the terminal plate 50J, when the terminal portion 52*b* does not penetrate through the plate portion 51 in the axial direction, the terminal portion 52*a* may penetrate through the plate portion 51 in the axial direction.

Figure 24:
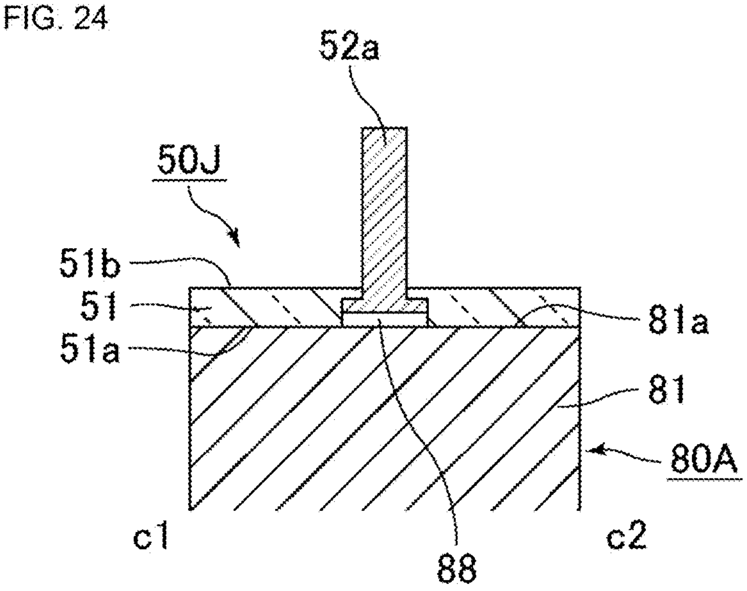
FIG. 24 is a schematic sectional view of another example of a section of the coil unit in FIG. 21 taken along the line segment c1 to c2.

FIG. 24 is a schematic sectional view of another example of a section of the coil unit in FIG. 21 taken along the line segment c1 to c2.

In the terminal plate 50J in FIG. 24, the terminal portion 52*a* penetrates through the plate portion 51 in the axial direction.

As illustrated in FIG. 24, a bottom portion of the terminal portion 52*a* may be wider than the other portion in the radial direction. In the terminal plate 50J, the bottom portion of the terminal portion 52*a* may be wider than the other portion in the circumferential direction. Namely, in the terminal plate 50J, the bottom portion of the terminal portion 52*a* may be wider than the other portion in at least one of the radial direction and the circumferential direction. As described above, since the bottom portion of the terminal portion 52*a* is widened, the terminal portion 52*a* is less likely to be removed from the plate portion 51 in the axial direction.

As illustrated in FIG. 24, the terminal portion 52*a* may be separated from the end surface 81*a* of the divided yoke 81 in the axial direction. Namely, a cavity 88 may be provided between the terminal portion 52*a* and the divided yoke 81. This permits a structure in which the terminal portion 52*a* is not in contact with the divided yoke 81 in a state that the terminal plate 50J is fixed to the end surface 81*a* of the divided yoke 81, even when the terminal portion 52*a* penetrates through the plate portion 51 in the axial direction. Thus, with the use of the structure illustrated in FIG. 24, insulation between the divided yoke 81 and the terminal portion 52*a* is ensured. Further, with the use of the structure illustrated in FIG. 24, as described below, when the one end portion 41*a* of the winding wire 41 is electrically coupled to a terminal of a wiring substrate by solder bonding, for example, heat generated during the solder bonding is less likely to be transferred from the terminal portion 52*a* to the divided yoke 81. As a result, since the divided core 80A is less likely to be damaged, lowering in the strength of the coil unit 70J (more specifically, divided core 80A) is suppressed.

Note that, in other coil units such as the coil unit 70A, the terminal portion does not necessarily penetrate through the plate portion in the axial direction.

Although the terminal plate has two terminal portions in the above aspects, the terminal plate may have only one terminal portion in the stator of the present disclosure. Namely, in the stator of the present disclosure, only one end portion of the winding wire may be fixed to the terminal portion in a state of being bound around the terminal portion.

Figure 25:
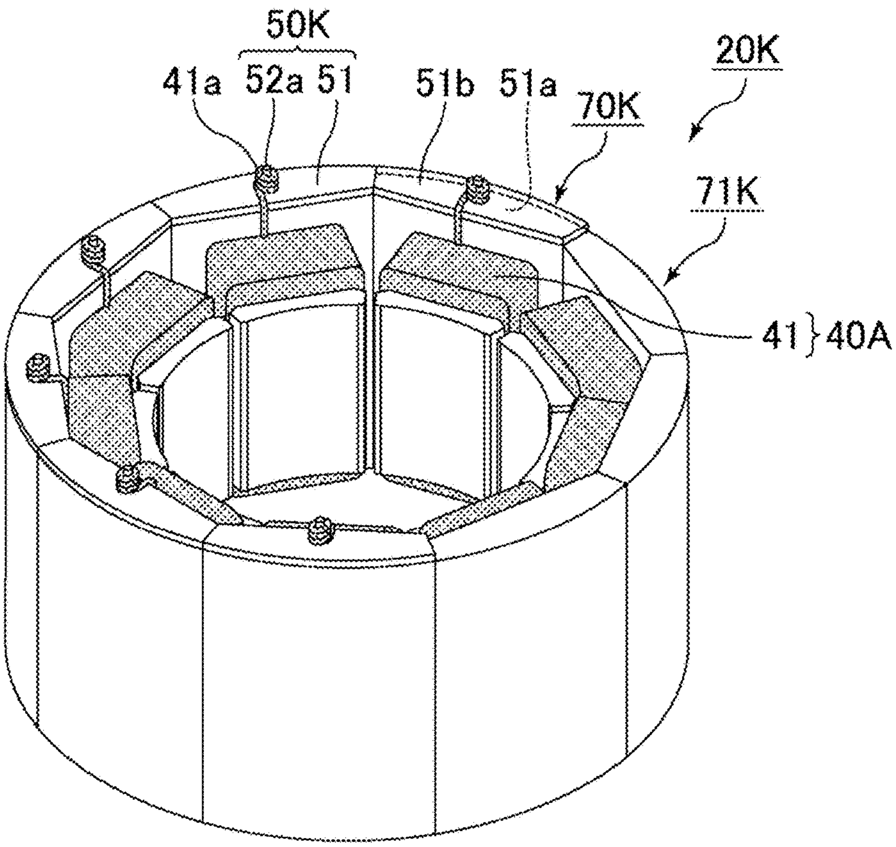
FIG. 25 is a schematic perspective view of an example of a stator in accordance with aspects of the present disclosure.
Figure 26:
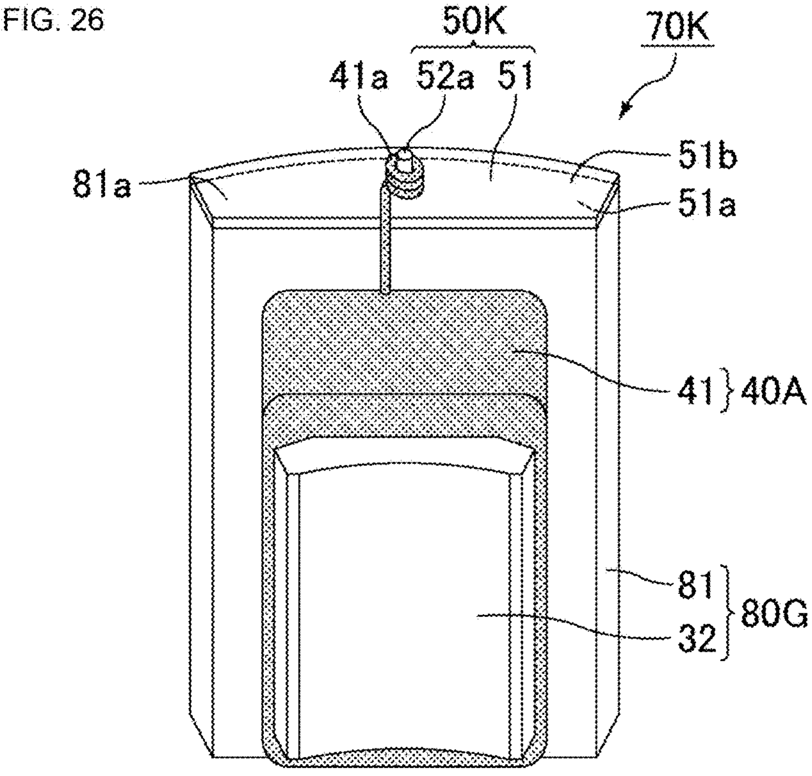
FIG. 26 is a schematic perspective view of a coil unit in FIG. 25.

FIG. 25 is a schematic perspective view of an example of a stator according to an aspect of the present disclosure. FIG. 26 is a schematic perspective view of a coil unit in FIG. 25.

A stator 20K in FIG. 25 includes a coil unit 70K.

The coil unit 70K in FIG. 26 includes the divided core 80G, the coil 40A, and a terminal plate 50K.

The divided core 80G of the coil unit 70K has the same configuration as the divided core 80G of the coil unit 70G.

The terminal plate 50K includes the plate portion 51 and the terminal portion 52*a*.

The one end portion 41*a* of the winding wire 41 is fixed to the terminal portion 52*a* in a state of being bound around the terminal portion 52*a*. Thus, the one end portion 41*a* of the winding wire 41 is extended to the terminal plate 50K.

In the stator 20K, the coil unit 70K is used when the winding wires 41 of the plurality of coils 40A are coupled in series, for example. In the case above, as illustrated in FIG. 25, the stator 20K may further include, in addition to the coil unit 70K, a coil unit 71K not having a structure in which both the end portions of the winding wire 41 are extended to the terminal plate. Namely, in the stator 20K, there may be mixed the coil unit 70K having a structure in which the one end portion 41*a* of the winding wire 41 is extended to the terminal plate and the coil unit 71K not having a structure in which both the end portions of the winding wire 41 are extended to the terminal plate.

In other coil units such as the coil unit 70A, the terminal plate may have only one terminal portion.

As described above, the aspect is described in which the stator core has a divided structure being divided into divided cores. However, in the stator of the present disclosure, the stator core may have an integrated structure in which the stator core is not divided.

With the use of a stator in which a stator core has the divided structure, the coils 40A may densely be arranged as compared with a stator in which a stator core has the integrated structure, and as a result, the number of the coils 40A may be increased. Thus, with the use of the stator in which the stator core has the divided structure, characteristics of the motor may easily be improved as compared with the stator in which the stator core has the integrated structure.

The stator of the present disclosure may be used not only as a constituent member of a motor, as described below, but also as a constituent member of a generator, for example.

A motor according to the present disclosure includes the stator according to the present disclosure and a rotor provided to face an inner circumferential surface of the stator.

An example of the motor according to the present disclosure will be described as a motor according to an aspect of the present disclosure.

Figure 27:
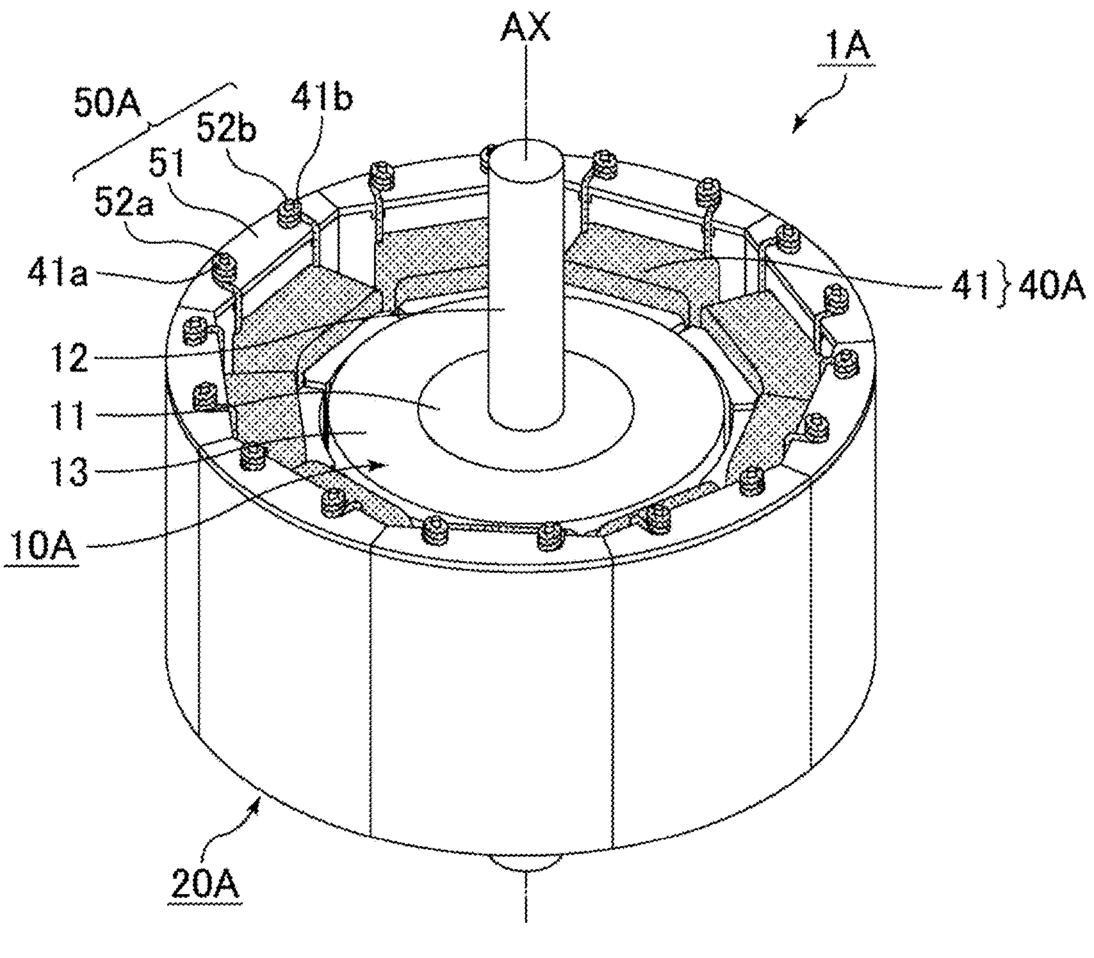
FIG. 27 is a schematic perspective view of an example of a motor in accordance with aspects of the present disclosure.

FIG. 27 is a schematic perspective view of an example of the motor according to an aspect of the present disclosure.

A motor 1A in FIG. 27 includes a rotor 10A and the stator 20A.

In the motor 1A, with an axis AX being a reference, the rotor 10A is positioned in a coaxially inner side portion, and the stator 20A is positioned in a coaxially outer side portion. The axis AX corresponds to a rotation axis of the rotor 10A.

The rotor 10A is provided to face an inner circumferential surface of the stator 20A.

The rotor 10A includes a rotor yoke 11, a shaft 12, and a permanent magnet 13, for example.

The rotor yoke 11 is formed of a bulk soft magnetic body, an electromagnetic steel plate, a powder magnetic core, or a resin molded body containing a soft magnetic material, for example.

The shaft 12 is inserted through the rotor yoke 11.

Examples of the constituent material of the shaft 12 include metals such as stainless steel.

A direction in which the shaft 12 extends, namely, a direction in which the axis AX extends is parallel to the axial direction.

The permanent magnet 13 is provided such that N poles and S poles are alternately arranged along an outer circumferential surface of the rotor yoke 11.

When viewed in the axial direction, the rotor 10A may have a substantially circular shape or a substantially polygonal shape.

In the present aspect, described is the motor having the stator 20A in which the plurality of coil units 70A are annularly arranged in the circumferential direction, but the same applies to a motor having a stator in which other coil units such as the coil unit 70B are annularly arranged in the circumferential direction.

The motor according to the present disclosure may further include a wiring substrate electrically coupled to the one end portion of the winding wire.

Figure 28:
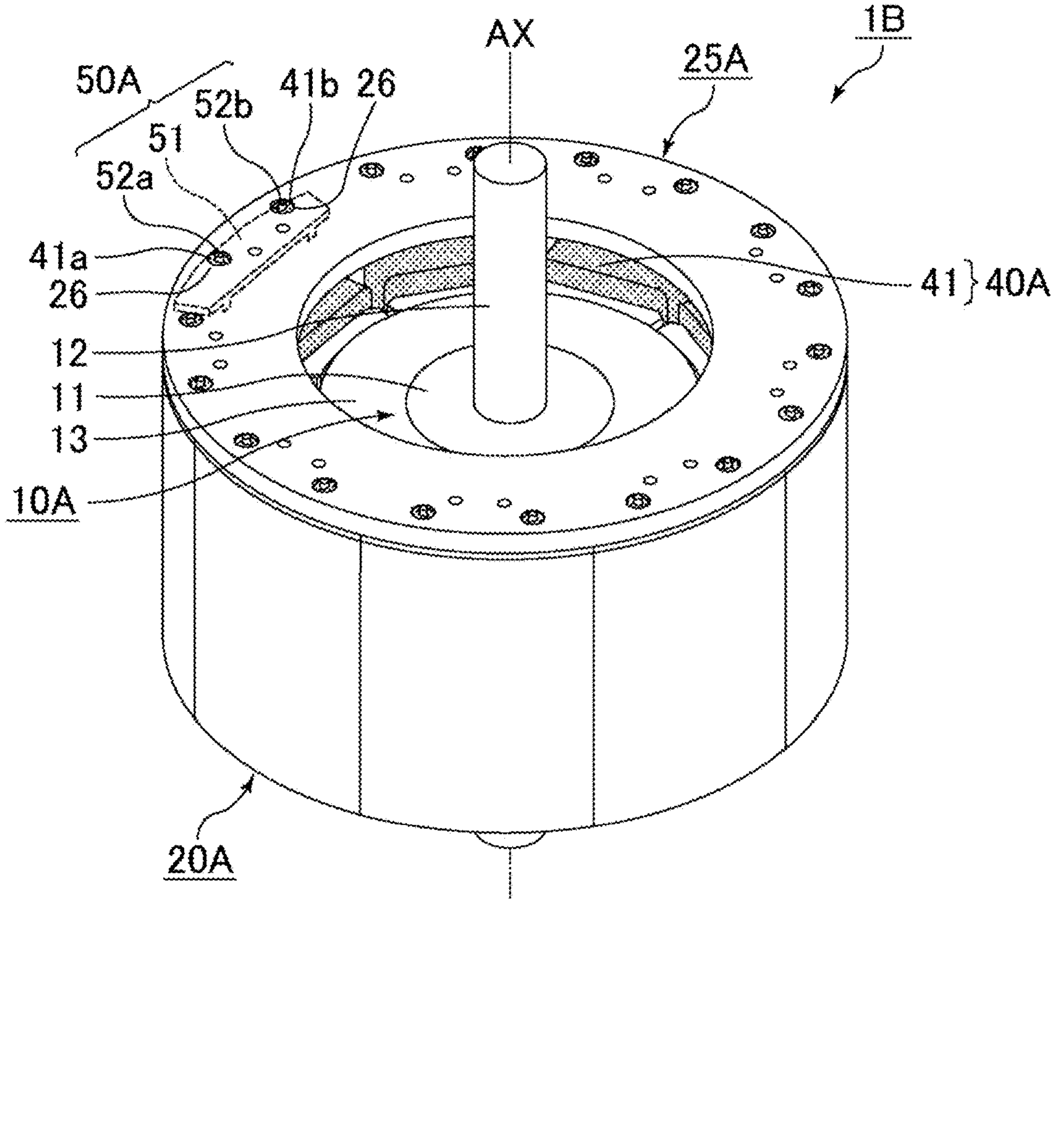
FIG. 28 is a schematic perspective view of an example of a motor in accordance with aspects of the present disclosure.

FIG. 28 is a schematic perspective view of an example of the motor according to an aspect of the present disclosure.

A motor 1B in FIG. 28 further includes a wiring substrate 25A in addition to the rotor 10A and the stator 20A.

The wiring substrate 25A is electrically coupled to the one end portion 41*a* of the winding wire 41 of the coil 40A included in the stator 20A. Further, the wiring substrate 25A is electrically coupled, for example, to the other end portion 41*b* of the winding wire 41 of the coil 40A included in the stator 20A. An example of the coupling aspect above will be described below.

A plurality of through-holes 26 penetrating through in the axial direction are provided to the wiring substrate 25A to be separated from each other in the circumferential direction.

In the wiring substrate 25A, terminals (not illustrated) are exposed from inner wall surfaces of the respective through-holes 26.

In the motor 1B, the wiring substrate 25A is placed on the stator 20A such that the terminal portions 52*a* and 52*b* pass through different through-holes 26. Alternatively, the one end portion 41*a* of the winding wire 41 is fixed to the terminal portion 52*a* in a state of being bound around the terminal portion 52*a*, and the other end portion 41*b* of the winding wire 41 is fixed to the terminal portion 52*b* in a state of being bound around the terminal portion 52*b*. Thus, in the state that the wiring substrate 25A is placed on the stator 20A as described above, the one end portion 41*a* of the winding wire 41 bound around the terminal portion 52*a* and the other end portion 41*b* of the winding wire 41 bound around the terminal portion 52*b* may efficiently be coupled to the terminals exposed from the inner wall surfaces of the different through-holes 26. With the use of the motor 1B, it is possible to easily realize electrical coupling of the one end portion 41*a* of the winding wire 41 and the terminal of the wiring substrate 25A, and electrical coupling of the other end portion 41*b* of the winding wire 41 and the terminal of the wiring substrate 25A.

Although the preferred aspect of the present disclosure is sufficiently described with reference to the accompanying drawings, various modifications and alterations are obvious to those skilled in the art. Such modifications and alterations should be considered to be included in the appended claims as long as they do not depart from the scope of the present disclosure defined by the claims.

DESCRIPTION OF REFERENCE SYMBOLS

1A 1B MOTOR
10A ROTOR
11 ROTOR YOKE
12 SHAFT
13 PERMANENT MAGNET
20A, 20K STATOR
25A WIRING SUBSTRATE
26 THROUGH-HOLE
30A STATOR CORE
31 YOKE
31*a* END SURFACE OF YOKE
32 TOOTH
40A COIL
41 WINDING WIRE
41*a* ONE END PORTION OF WINDING WIRE
41*b* OTHER END PORTION OF WINDING WIRE
50A, 50B, 50C, 50D, 50E, 50G, 50J, 50K TERMINAL PLATE
51 PLATE PORTION
51*a* FIRST MAIN SURFACE OF PLATE PORTION
51*b* SECOND MAIN SURFACE OF PLATE PORTION
52*a*, 52*b* TERMINAL PORTION
55*a*, 55*b*, 55*c*, 55*d*, 55*e* PROTRUSION OF PLATE PORTION
56*a*, 56*b*, 56*c* RECESS OF PLATE PORTION
57*a* WINDING WIRE RECESS
70A 70B 70C 70D 70E 70F 70G 70H 70J 70K 71K COIL UNIT
80A, 80B, 80C, 80D, 80E, 80F, 80G, 80H DIVIDED CORE
81 DIVIDED YOKE
81*a* END SURFACE OF DIVIDED YOKE
85*a*, 85*b*, 85*c* PROTRUSION OF DIVIDED YOKE
86*a*, 86*b*, 86*c*, 86*d*, 86*e*, 86*f* RECESS OF DIVIDED YOKE
87*a*, 87*b* DENT OF DIVIDED YOKE
88 CAVITY
90A, 90B, 90C, 90D, 90E, 90F, 90*aa*, 90*ab*, 90*ba*, 90*bb*, 90*ca*, 90*cb*, 90*da*, 90*ea*, 90*fa* FITTING PORTION
AX AXIS

The invention claimed is:

1. A stator comprising:

a stator core comprising a molded body of magnetic powder that includes an annular yoke extending in a circumferential direction and a tooth protruding from an inner circumferential surface of the yoke in a radial direction of the yoke;

a coil including a winding wire wound around the tooth; and a terminal plate fixed to an end surface of the yoke in an axial direction of the stator core, wherein the terminal plate includes a plate portion and a terminal portion fixed to the plate portion, wherein the plate portion includes, in the axial direction, a first main surface positioned on a side of the end surface of the yoke and a second main surface positioned on a side opposite to the end surface of the yoke, wherein the terminal portion protrudes in the axial direction from the second main surface of the plate portion, and wherein one end portion of the winding wire is fixed to the terminal portion by being bound around the terminal portion.

2. The stator according to claim 1, wherein the terminal plate is disposed in a non-overlapping position of the winding portion of the coil.

3. The stator according to claim 1, wherein the end surface of the yoke and the first main surface of the plate portion are fitted to each other at a fitting portion.

4. The stator according to claim 3, wherein the fitting portion comprises a protrusion that protrudes in the axial direction from one of: the end surface of the yoke, the first main surface of the plate portion, a recess that is recessed in the axial direction from another of the end surface of the yoke, or the first main surface of the plate portion.

5. The stator according to claim 4, wherein the fitting portion overlaps with a peripheral edge of the end surface of the yoke and a peripheral edge of the first main surface of the plate portion in the axial direction.

6. The stator according to claim 4, wherein the fitting portion includes a first fitting portion and a second fitting portion positioned inside the first fitting portion in the radial direction.

7. The stator according to claim 6, wherein the fitting portion further includes a third fitting portion that is positioned inside the first fitting portion in the radial direction and is separated from the second fitting portion in the circumferential direction.

8. The stator according to claim 5, wherein the winding wire extends towards the terminal portion and is configured to contact the protrusion on a side of the one end portion.

9. The stator according to claim 4, wherein the fitting portion overlaps with the terminal portion in the axial direction, and wherein the protrusion protrudes from the first main surface of the plate portion in the axial direction, and the recess is recessed from the end surface of the yoke in the axial direction.

10. The stator according to claim 3, wherein the fitting portion is formed by fitting the plate portion and a recess that is recessed from the end surface of the yoke in the axial direction.

11. The stator according to claim 1, wherein a winding wire recess is provided to a peripheral edge of the second main surface of the plate portion when viewed in the axial direction, and the winding wire extends toward the terminal portion to pass through the winding wire recess on a side of the one end portion.

12. The stator according to claim 1, wherein the end surface of the yoke is bonded to the first main surface of the plate portion.

13. The stator according to claim 1, wherein the end surface of the yoke comprises a dent overlapping with the terminal portion in the axial direction, and the terminal portion is separated from a bottom surface of the dent in the axial direction.

14. The stator according to claim 1, wherein the terminal portion is configured to not penetrate through the plate portion in the axial direction.

15. The stator according to claim 1, wherein an inner end of the terminal plate is not positioned inside an inner side portion of the yoke in the radial direction.

16. The stator according to claim 1, wherein a plurality of coil units are annularly arranged in the circumferential direction, and the plurality of coil units each independently include a divided core obtained by dividing the stator core in the circumferential direction, the coil, and the terminal plate.

17. The stator according to claim 1, wherein the stator core comprises a powder magnetic core.

18. The stator according to claim 1, wherein the terminal portion comprises a conductive material.

19. A motor comprising:

a stator comprising:

a stator core comprising a molded body of magnetic powder that includes an annular yoke extending in a circumferential direction and a tooth protruding from an inner circumferential surface of the yoke in a radial direction of the yoke, formed of a molded body of magnetic powder;

a coil including a winding wire wound around the tooth; and a terminal plate fixed to an end surface of the yoke in an axial direction of the stator core, wherein the terminal plate includes a plate portion and a terminal portion fixed to the plate portion, wherein the plate portion includes, in the axial direction, a first main surface positioned on a side of the end surface of the yoke and a second main surface positioned on a side opposite to the end surface of the yoke, wherein the terminal portion protrudes in the axial direction from the second main surface of the plate portion, and wherein one end portion of the winding wire is fixed to the terminal portion by being bound around the terminal portion; and a rotor that faces an inner circumferential surface of the stator.

20. The motor according to claim 19, further comprising a wiring substrate electrically coupled to the one end portion of the winding wire.

* * * * *